(12) United States Patent
Tillet et al.

(10) Patent No.: US 9,525,981 B2
(45) Date of Patent: Dec. 20, 2016

(54) SHARING A TALKGROUP

(71) Applicant: Iridium Satellite LLC, McLean, VA (US)

(72) Inventors: Daniel Tillet, McLean, VA (US); Garrett Chandler, McLean, VA (US)

(73) Assignee: Iridium Satellite LLC, McLean, VA (US)

( * ) Notice: Subject to any disclaimer, the term of this patent is extended or adjusted under 35 U.S.C. 154(b) by 0 days.

(21) Appl. No.: 14/617,302

(22) Filed: Feb. 9, 2015

(65) Prior Publication Data

US 2016/0234658 A1  Aug. 11, 2016

(51) Int. Cl.
*H04B 7/00* (2006.01)
*H04W 4/08* (2009.01)
*H04W 72/04* (2009.01)

(52) U.S. Cl.
CPC ............. *H04W 4/08* (2013.01); *H04W 72/048* (2013.01)

(58) Field of Classification Search
USPC .......................... 455/416, 517–520; 709/204
See application file for complete search history.

(56) References Cited

U.S. PATENT DOCUMENTS

| | | | | |
|---|---|---|---|---|
| 5,933,780 A * | 8/1999 | Connor | ................. | H04W 84/08 455/413 |
| 7,693,533 B2 * | 4/2010 | Sung | ....................... | H04W 4/10 370/260 |
| 7,933,621 B1 * | 4/2011 | Vu | .......................... | H04W 4/08 455/518 |
| 8,639,278 B1 * | 1/2014 | Samios | ............... | H04W 76/005 455/422.1 |
| 2006/0035656 A1 * | 2/2006 | Sung | ....................... | H04W 4/10 455/518 |
| 2008/0239996 A1 * | 10/2008 | Lohmar | .............. | H04L 12/1818 370/261 |
| 2012/0115494 A1 * | 5/2012 | Christensen | ............ | H04W 4/08 455/450 |
| 2014/0038668 A1 * | 2/2014 | Vasavada | ............ | H04L 65/4061 455/556.1 |

* cited by examiner

*Primary Examiner* — Fayyaz Alam
(74) *Attorney, Agent, or Firm* — Baker Botts L.L.P.

(57) ABSTRACT

A request to provide a sharecode is received from a first communication device associated with a first organization, and the sharecode is provided. Thereafter, the sharecode and a talkgroup sharing parameter are received from a second communication device associated with a second organization. The talkgroup sharing parameter identifies a talkgroup associated with the second organization to be shared with the first organization. An indication that one or more devices associated with the first organization are permitted to participate in the talkgroup associated with the second organization then is provided to the first communication device associated with the first organization. Thereafter, a request is received from the first communication device associated with the first organization to add a device associated with the first organization to the talkgroup associated with the second organization, and a device associated with the first organization is added to the talkgroup associated with the second organization.

20 Claims, 16 Drawing Sheets

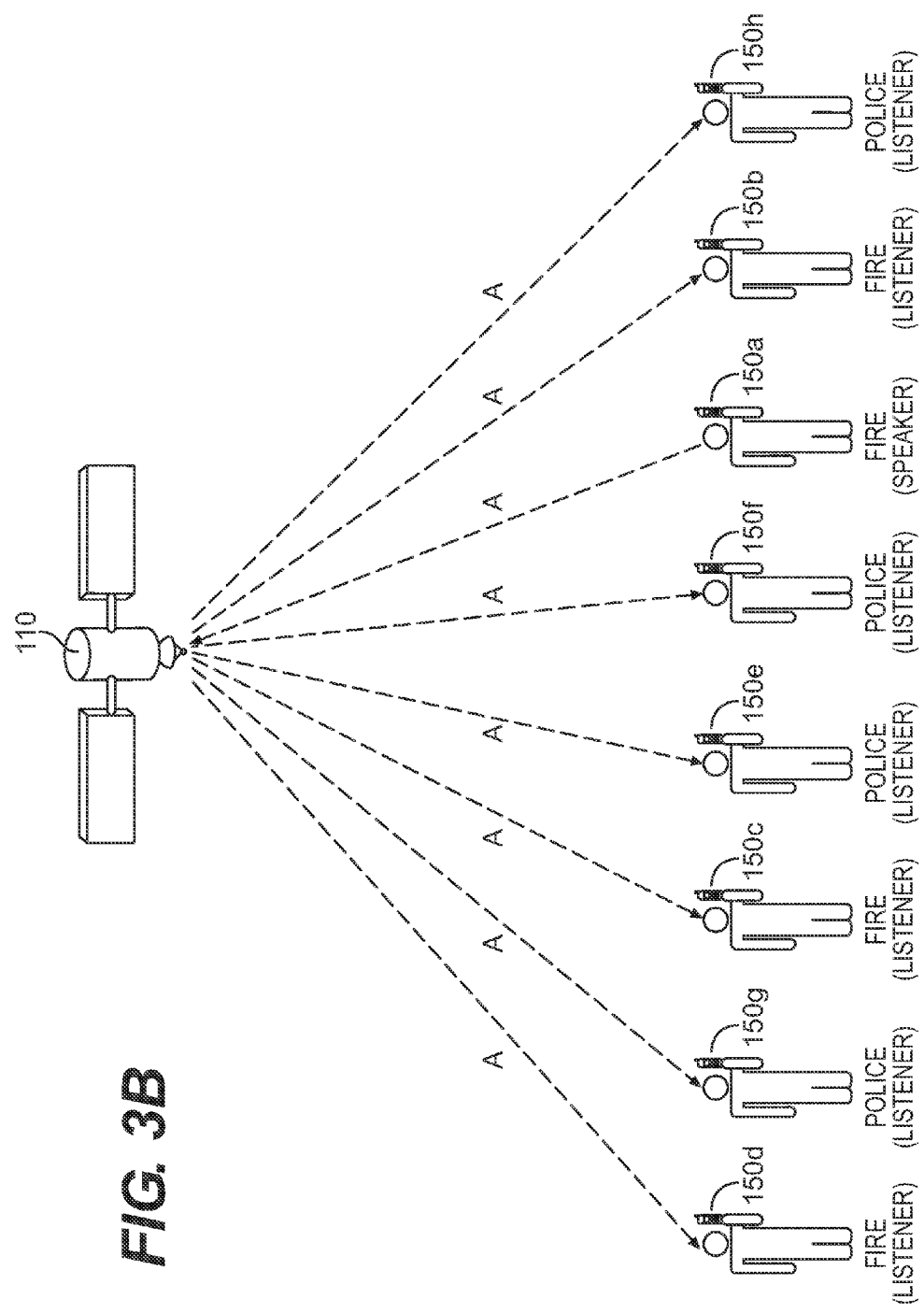

SHARING A TALKGROUP

TECHNICAL FIELD

The disclosure relates generally to Push-To-Talk talkgroups, and more specifically to sharing a Push-To-Talk talkgroup.

BACKGROUND

Some implementations of Push-To-Talk involve talkgroups that enable a user of handset provisioned to access the talkgroups to speak to an entire talkgroup by pushing a button.

SUMMARY

According to one implementation, a request to provide a sharecode is received from a first communication device associated with a first organization, and the sharecode is provided. Thereafter, the sharecode and at least one talkgroup sharing parameter are received from a second communication device associated with a second organization. The at least one talkgroup sharing parameter identifies at least one talkgroup associated with the second organization to be shared with the first organization. An indication that one or more devices associated with the first organization are permitted to participate in the talkgroup associated with the second organization then is provided to the first communication device associated with the first organization. Thereafter, a request is received from the first communication device associated with the first organization to add at least one device associated with the first organization to the talkgroup associated with the second organization, and at least one device associated with the first organization is added to the talkgroup associated with the second organization.

Other features of the present disclosure will be apparent in view of the following detailed description of the disclosure and the accompanying drawings. Implementations described herein, including the above-described implementation, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

FIG. 3B is a schematic diagram showing a satellite-based implementation of talkgroup sharing by different organizations, in accordance with particular implementations of the present disclosure.

DETAILED DESCRIPTION

Figure 1:
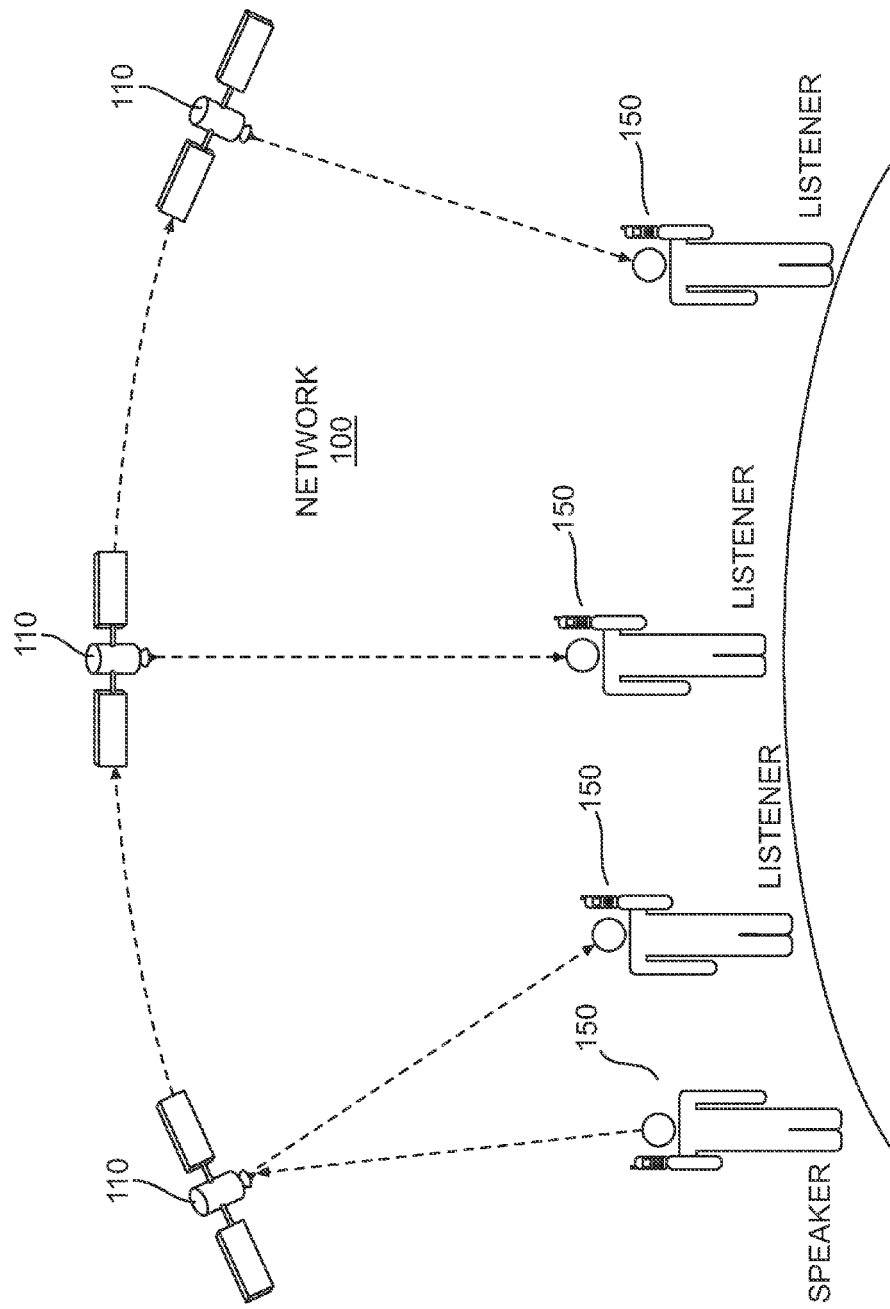
FIG. 1 is a block diagram of a network for satellite-based communications using one or more communication methods, in accordance with particular implementations of the present disclosure.

Referring now to FIG. 1, a network 100 may facilitate communication between communication devices using one or more communication methods. In some implementations, network 100 may include a plurality of cross-linked satellites 100 that may transmit communication signals therebetween. Network 100 may further include a plurality of communication devices 150 (e.g., satellite telephones), which are each provisioned to participate in one or more Push-To-Talk ("PTT") talkgroups (described below in more detail), and which one or more users may use to communicate via network 100.

As illustrated in FIG. 1, when a user of a communication device 150 "takes the floor" in a PTT talkgroup (e.g., the user being a "speaker"), the user's communications may be transmitted up to a satellite 110 (e.g., a satellite 110 with a geographic footprint covering the location of the user's communication device 150) and then relayed (e.g., either directly via a single satellite 110 or via satellite cross-links between a plurality of satellites 110) to communication devices 150 of other users currently participating in the same PTT talkgroup (e.g., each of the other users being a "listener"). Thus, provisioning the communication devices 150 associated with a particular group of users (e.g., a police department, a fire department, the national guard) to participate in the PIT talkgroup may enable a user within the particular group to simultaneously communicate information to all other users within the particular group with communication devices that are participating in the PTT talkgroup.

In some implementations, a PTT system may utilize a half-duplex traffic channel for an individual PTT talkgroup. When a user of a communication device 150 provisioned to access the PTT talkgroup desires to "take the floor," the user may instruct the communication device 150 to switch from a reception mode on the traffic channel to a transmit mode on the traffic channel, for example, by pressing and holding a "talk" button on communication device 150. After the communication device 150 transitions to the transmit mode on the traffic channel, communications transmitted by the communication device 150 on the traffic channel may be broadcast to other communication devices 150 that also are provisioned to participate in the PTT talkgroup and that currently are connected to the PIT talkgroup. When the user releases the "talk" button, communication device 150 may transition back to the reception mode on the traffic channel from the transmit mode on the traffic channel, thereby enabling other members of the PTT talkgroup to "take the floor" themselves.

Figure 2:
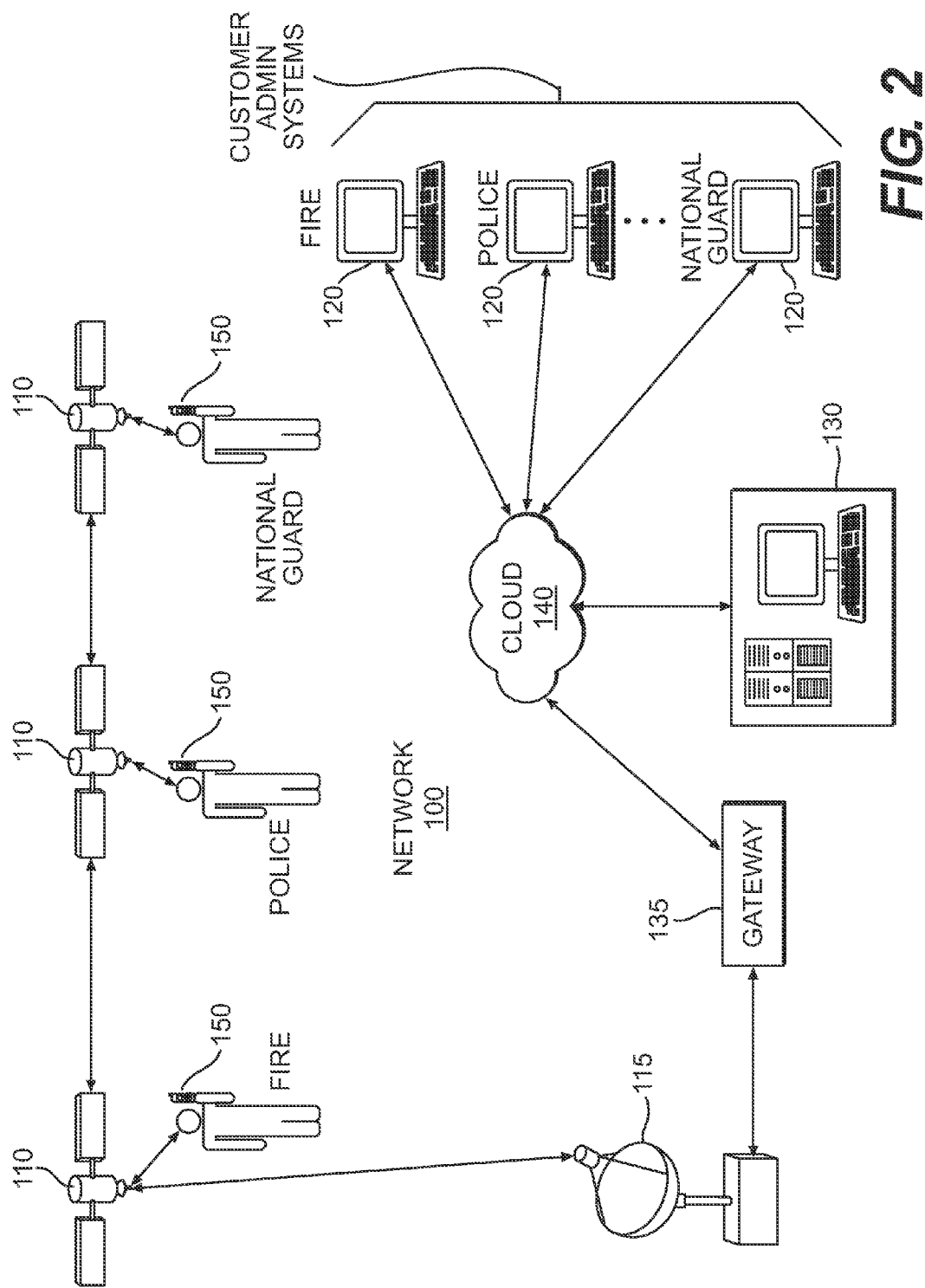
FIG. 2 is a block diagram of a network for satellite-based communications using one or more communication methods showing an example network infrastructure, in accordance with particular implementations of the present disclosure.

Referring now to FIG. 2, example infrastructure of network 100 now is described in more detail. Specifically, FIG. 2 illustrates a block diagram of an example network infrastructure for satellite-based communication using one or more communication methods. Network 100 may comprise a plurality of satellites 110, each of which may permit the exchange of information and services among devices that are connected via satellites 110. Network 100 may also comprise a plurality of satellite links 115 (e.g., earth-based satellite dishes, vehicle-based satellite dishes, high-power transmitters and receivers, antennas, earth terminals, teleports) that may be configured to communicate with the one or more satellites 110 and relay data back and forth with the one or more satellites 110. In certain implementations, network 100 may comprise a plurality of cross-linked satellites 110 that effectively form a network between satellites 110 across which communications can be transferred. In other implementations, for example, network 100 may comprise one or more satellites 110 that do not directly connect to one another. In such other implementations, each satellite 110 may have a "bent pipe" architecture in which satellites 110 may only connect indirectly with one another through terrestrial-based systems, for example. In particular implementations, for example, network 100 may comprise one or more terrestrial communication nodes that may perform functions similar to satellites 110. Thus, although aspects of this disclosure may be discussed generally with respect to a constellation of cross-linked satellites, aspects of this disclosure may be readily applied to satellites utilizing a bent-pipe architecture, terrestrial communication systems, and any other arrangement or combinations of arrangements of communication devices.

As illustrated in FIG. 2, network 100 may comprise one or more operation hubs 130 (e.g., a Network Operations Center ("NOC")) configured to connect to at least one of the plurality of satellites 110. An operation hub 130 may comprise one or more locations (e.g., devices) that may monitor, control, or manage network 100. Each operation hub 130 may manage and monitor one or more satellites 110. For example, operation hub 130 may control movement or positioning of a satellite 110, may receive and monitor communications between a satellite 110 and other devices, or may determine when a satellite 110 needs maintenance. In some implementations, a dedicated operation hub 130 may be established for each satellite 110. Alternatively, in some other implementations, an operation hub 130 may manage and monitor a plurality of satellites 110. In such implementations, operation hub 130 may directly connect with only one satellite 110 that is within range for direct communication with operation hub 130 via satellite link 115, or possibly a few satellites 110 that are within range of satellite link 115. Nevertheless, operation hub 130 may be able to indirectly connect to—and, therefore, manage and control—other satellites 110 in network 100 via satellite cross-links between the satellite (or satellites) 110 within range of satellite link 115 and satellites 110 outside the range of satellite link 115. In certain implementations, for example, operation hub 130 may establish a connection with one or more satellites 110 within a constellation of cross-linked satellites 110 via an interconnected cloud 140, gateway 135, and satellite link 115, as shown in FIG. 2.

Operation hub 130 may function as a management center and may mange a plurality of PTT talkgroups (described in more detail below) assigned to a plurality of devices, such as communication devices 150 (described below in more detail), and/or organizations.

In some implementations, one or more satellites 110 may reside in a geostationary orbit, and operation hub 130 may always communicate, via satellite link 115, with the same satellite 110. Alternatively, as described above, in other implementations, one or more satellites 110 may not reside in a geostationary orbit e.g., the satellites may reside in low earth orbit), and operation hub 130 may communicate with different satellites 110 at different times via satellite link 115 depending on which satellite 110 or satellites 110 are within range for communication with operation hub 130 via satellite link 115 at the time.

As noted above, operation hub 130 may be connected to one or more clouds 140, which may be public clouds, private clouds, or community clouds. Each cloud 140 may permit the exchange of information and services among devices (e.g., operation hub 130) that are connected to such clouds 140. In certain implementations, cloud 140 may be a wide area network, such as the Internet. In some implementations, cloud 140 may be a local area network, such as an intranet. Further, cloud 140 may be a closed, private network in certain implementations, and cloud 140 may be an open network in other implementations. Cloud 140 may facilitate the transmission of information among users or devices (e.g., operation hub 130, devices 120) that are connected to cloud 140 through any number of communication means, such as a wireless transmission infrastructure or a wired transmission infrastructure, for example.

One or more communication devices 120 may connect with cloud 140. Such devices 120 may communicate with communication devices 150 via cloud 140, gateway 135, satellite link 115, and one or more satellites 110. Devices 120 may include, for example, one or more general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants, routers, switches, and any other suitable communication device. Particular devices 120 may be affiliated with particular organizations to which PTT talkgroups have been assigned, for example. Certain devices 120 connected with cloud 140 may be affiliated with organizations to which PTT talkgroups have not been assigned.

As shown in FIG. 2, for example, communication devices 150 associated with a fire-rescue organization may be provisioned to access a first set of one or more PTT talkgroups, communication devices 150 associated with a police organization may be provisioned to access a second set of one or more different PTT talkgroups, and communication devices 150 associated with a national guard organization may be provisioned to access a third set of one or more different PTT talkgroups. In addition, administrative systems for each of these organizations, such as devices 120 shown in FIG. 2, may be linked to and used to manage affiliated communication devices 150 via one or more cloud 140, gateway 135, satellite link 115, and satellite 110. Thus, a plurality of different organizations (e.g., Fire, Police, National Guard) may subscribe to a PTT service offered by a communications provider, and each subscribing organization may manage one or more talkgroups that the organization's members may use to participate in the PTT service. In some implementations, an organization may be linked to and manage its talkgroups through a web portal, for example, accessible via one of devices 120.

Among other aspects of managing its talkgroups, each organization may manage the membership of its talkgroups. For example, an individual organization, such as the Fire Department, may own (or otherwise be affiliated with) fifty communication devices 150 and may subscribe to a PTT service that enables communication devices 150 owned by (or otherwise affiliated with) the Fire Department to participate in one or more of ten different talkgroups affiliated with the Fire Department. An administrator associated with the Fire Department then may use one of devices 120 to control which of the fifty communication devices 150 owned by (or otherwise affiliated with) the Fire Department can access each of the ten different talkgroups affiliated with the Fire Department. It will be appreciated that the membership of each of the ten different talkgroups affiliated with the Fire Department may be different. That is to say, the communication devices owned by (or otherwise affiliated with) the Fire Department that the administrator causes to be provisioned to be able to access each of ten different talkgroups may be different.

Network 100 may include a plurality of gateways 135. In particular implementations, gateways 135 may act as a bridge between satellite link 115 and cloud 140, operation hub 130, or devices 120. In such implementations, gateways 135 may communicate with satellites 110 via satellite links 115. In certain implementations, gateways 135 may utilize other methods requiring less infrastructure, such as low power antennas, transmitters, or receivers, to communicate directly with satellites 110, such as in a manner similar to communication devices 150, for example. In such implementations, gateways 135 may serve as bridges between satellites 110, cloud 140, operation hub 130, or devices 120. Thus, gateways 135 may permit the free (or controlled) flow of data between satellites 110, cloud 140, operation hub 130, and devices 120. More specifically, gateways 135 may control or monitor the flow of data between satellites 110 and cloud 140, operation hub 130, and devices 120. In some implementations, gateways 135 may normalize data, translate data, compress data, or perform other operations that may promote reliable communications between such systems.

As noted above, network 100 also may include a plurality of communication devices 150. Similar to devices 120, communication devices 150 may include, for example, one or more satellite telephones, general purpose computing devices, specialized computing devices, mainframe devices, wired devices, wireless devices, monitoring devices, infrastructure devices, other devices configured to provide information to service providers and users, telephones, mobile phones, computer devices, tablet computers, personal digital assistants routers, switches, and any other suitable communication device. Communication devices 150 may be configured to collect data from or provide data to one or more data sources (e.g., servers, networks, interfaces, other devices). For example communication devices 150 may collect information from network 100, operation hub 130, satellite link 115, satellites 110, and other devices connected to satellites 110, such as other communication devices 150. By collecting this information, communication devices 150 may perform one or more tasks associated with talkgroups (as discussed in more detail below) and other communication methods.

More particularly, communication devices 150 may establish direct communication with satellites 110 orbiting above their terrestrial (or other) positions. Accordingly, communication devices 150 may utilize satellites 110 to establish communication with other communication devices 150, with operation hub 130, with cloud 140, with devices 120, with gateway 135, or with any other suitable device or system connected to network 100. Communication devices 150 may include features similar to those of devices 120 and may similarly communicate with operation hubs 130 and gateways 135 in certain implementations.

Network 100 may be configured to facilitate Push-To-Talk ("PTT") communication. PTT communication is a method of communicating that may use half-duplex communication lines in which a communication device, such as a communication device 150, switches between a dedicated transmission mode and a dedicated reception mode. In some implementations of PTT communication, the communication device may remain in the dedicated reception mode by default and may switch to the dedicated transmission mode only while a "talk" button is pushed or otherwise activated. In other implementations of PTT communication, the communication device may switch from the dedicated reception mode to the dedicated transmission mode in response to a first trigger, such as the selection of the dedicated transmission mode on the communication device, the detection of a particular sound (e.g., a user's voice, a particular word or command, a particular tone), or the receipt of any other instruction or command to switch to the dedicated transmission mode, and the communication device may remain in the dedicated transmission mode until a second trigger occurs and the communication device switches to the dedicated reception mode in response thereto. For example, the second trigger may include the selection of the dedicated reception mode on the communication device, the lapse of a particular period of time (e.g., 30 seconds, 1 minute, 5 minutes, 30 minutes, 1 hour) in the dedicated transmission mode, the absence of a particular sound (e.g., the user's voice), the detection of a particular sound (e.g., a particular word or command, a particular tone), or the receipt of any other instruction or command to end the dedicated transmission mode or to switch to the dedicated reception mode.

PTT communication may facilitate communication between a plurality of devices, such as communication devices 150, by establishing communication protocols that govern which communication device 150 "has the floor" (e.g., is set to a dedicated transmission mode) and which communication device or devices 150 are listening (e.g., are set to the dedicated reception mode). Consequently, PTT communication may efficiently allocate communication roles (e.g., either being in a dedicated transmission mode or being in a dedicated reception mode) among a group of communication devices 150.

In some implementations of PTT communication, communication systems other than half-duplex communication lines may be used. For example, some implementations of PTT communication may utilize two-way (or full) duplex communication lines in which a plurality of communication devices 150 may simultaneously be in transmission modes. In such alternative implementations, for example, users of a plurality of communication devices 150 may speak simultaneously and may all be heard by users of other communication devices 150 connected with the speaking users.

In PTT communication, communication may occur via one or more talkgroups. A plurality of communication devices may connect to one or more talkgroups, for example, by connecting to one or more particular traffic channels assigned to the one or more talkgroups. In particular, a communication device set to the dedicated transmission mode (e.g., the communication device "with the floor") and connected to a particular talkgroup may transmit a communication to other devices connected to the talkgroup by transmitting an electromagnetic signal at the frequency assigned to the traffic channel for the talkgroup that is broadcast to other communication devices that also are connected to the talkgroup and that are set to the dedicated reception mode. For example, a user may speak into a first communication device set to the dedicated transmission mode and connected to the particular talkgroup; the first communication device may encode the user's message in a radio signal and transmit the radio signal at the frequency assigned to the particular talkgroup for the geographic location of the first communication device; a device in a communications system (e.g., a satellite in a constellation of cross-linked communications satellite) may receive the radio signal and cause the radio signal to be rebroadcast (e.g., by one or more satellites in a constellation of cross-linked communications satellites) at the frequency(ies) assigned to the talkgroup for one or more corresponding geographic locations; one or more second communication devices located within the one or more corresponding geographic locations, connected to the talkgroup, and set to the dedicated reception mode may receive the radio signal, including the encoded message; and the one or more second communication devices may output the user's message in the user's voice to the respective users of the one or more second communication devices. In this manner, a communication device set to the dedicated transmission mode and connected to the particular talkgroup may transmit a communication (e.g., a voice communication, Morse code, a data packet) simultaneously to multiple other communication devices connected to the particular talkgroup and set to the dedicated reception mode.

As will be described in greater detail below, for example in connection with FIGS. 3A and 3B, one or more PTT talkgroups may be assigned to a particular organization, a particular group of devices, a particular group of users or organizations, or some combination thereof. In certain implementations, the membership of a talkgroup (e.g., the communication devices permitted to communicate using the talkgroup) typically may be limited to communication devices affiliated with an organization to which the talkgroup is assigned. However, situations may arise in which it may be useful for the organization to which the talkgroup is assigned to provide a user (or affiliated communication device) that is not a member of (or associated with) the organization with limited access to the talkgroup. In other words, it may be useful to share one or more of the organization's assigned talkgroups with a non-member or other user or device that may not otherwise have access to such talkgroup(s). Such sharing of a talkgroup may allow for opening of the membership of the talkgroup to members of one or more organizations other than the organization to which the talkgroup is assigned, for example.

Figure 3A:
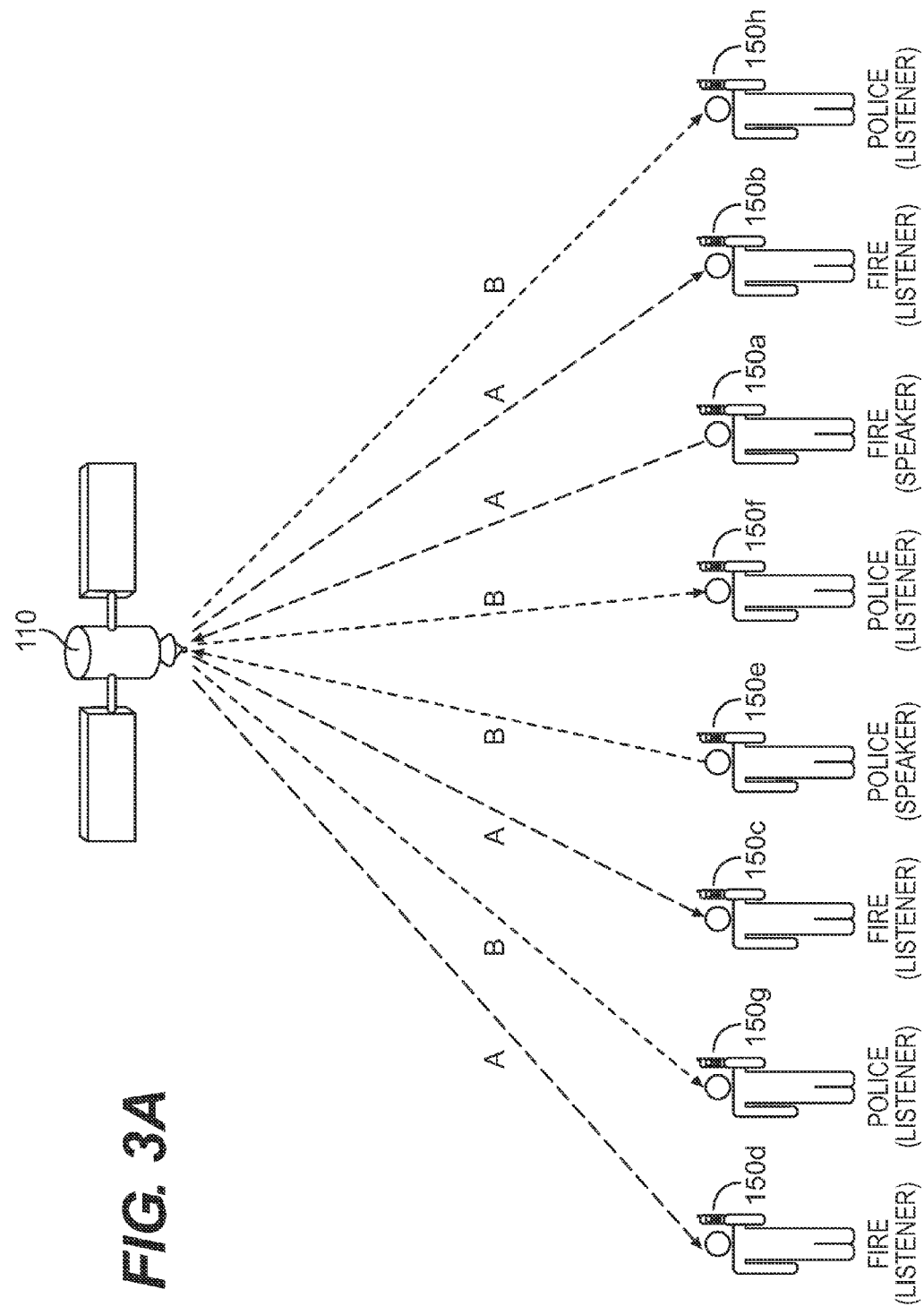
FIG. 3A is a schematic diagram showing a satellite-based implementation of talkgroups assigned to different organizations, in accordance with particular implementations of the present disclosure.

Referring now to FIG. 3A, example talkgroups assigned to different organizations are described in more detail. In FIG. 3A, example users of a PTT communication system, such as network 100 for example, from two different organizations are shown: users from a fire-fighting organization and users from a police-responder organization. Communication devices 150a, 150b, 150c, 150d may be associated with users from the fire-fighting organization, and communication devices 150e, 150f, 150g, 150h may be associated with users from the police-responder organization.

A talkgroup A may be assigned to the fire-fighting organization, and communication devices 150a-d may be provisioned to participate in talkgroup A to enable users of communication devices 150a-d to communicate amongst themselves over talkgroup A. For example, FIG. 3A shows an example situation in which communication device 150a is set to the dedicated transmission mode (e.g., the user of communication device 150a is a speaker) and communication devices 150b-d are set to the dedicated reception mode (e.g., the users of communication devices 150b-d are listeners), such that the user of communication device 150a may speak to the users of communication devices 150b-d using PTT communication implemented through satellite 110.

Similarly, a talkgroup B may be assigned to the police-responder organization, and communication devices 150e-h may be provisioned to participate in talkgroup B to enable users of communication devices 150e-h to communicate amongst themselves over talkgroup B. For example, FIG. 3A shows an example situation in which communication device 150e is set to the dedicated transmission mode (e.g., the user of communication device 150e is a speaker) and communication devices 150f-h are set to the dedicated reception mode (e.g., the users of communication devices 150f-h are listeners), such that the user of communication device 150e may speak to the users of communication devices 150f-h using PTT communication implemented through satellite 110.

As shown in FIG. 3A, talkgroup A may be assigned to the fire-fighting organization, such that only communication devices owned by (or otherwise affiliated with) the fire-fighting organization may communicate using talkgroup A. Similarly, talkgroup B may be assigned to the police-responder organization, such that only communication devices owned by (or otherwise affiliated with) the police-responder organization may communicate using talkgroup B. Nevertheless, situations may arise (e.g., natural disasters, terrorist activities, cooperative endeavors) in which it may be useful for the fire-fighting organization to temporarily share one or more talkgroups assigned to the fire-fighting organization with the police-responder organization or vice versa.

Referring now to FIG. 3B, an example situation in which an organization shares a talkgroup assigned to it with another organization is shown. Specifically, FIG. 3B shows an example situation in which the fire-fighting organization shares talkgroup A, which is assigned for use by the fire-fighting organization, with users from the police-responder organization. In particular, the fire-fighting organization may share access rights to talkgroup A, such that one or more of communication devices 150e-h also may access talkgroup A. FIG. 3B shows device 150*a* in a dedicated transmission mode and each of devices 150*b-h* in a dedicated reception mode, but any of communication devices 150*b-h* may be set to the dedicated transmission instead of communication device 150*a*, including any of communication devices 150*e-h*, which are affiliated with the police-responder organization. Accordingly, members of the police-responder organization may use communication devices 150*e-h* to listen to communications from the member of the fire-fighting organization speaking into communication device 150*a* or vice versa, for example.

Although FIG. 3B shows all of communication devices 150*e-h* accessing talkgroup A, other implementations may only grant access to a subset of less than all of the communication devices affiliated with the police-responder organization, such as only communication device 150*e* or 150*f*. Further, although particular implementations of talkgroup sharing may allow any communication device that may access talkgroup A to take the floor (e.g., be set to a dedicated transmission mode), certain implementations of talkgroup sharing may restrict communication devices affiliated with the police-responder organization (e.g., the organization to which the talkgroup is not been assigned) to certain functions, such as listening only (e.g., such devices may not be set to the dedicated transmission mode) or time-limited access (e.g., access only for a limited period of time or only during limited time windows within a period of time), for example.

The teachings of the present disclosure may provide a talkgroup sharing module that allows an organization, such as the fire-fighting organization described in the example above, to control the security and privacy of the organization's own talkgroups so that any talkgroup sharing with another organization may be for a limited period of time or for a limited number of devices. In particular implementations, for example, the talkgroup sharing module may facilitate the exchange of a "sharecode" between the organizations to initiate a shared talkgroup, in which the talkgroup owning organization may be configured to retain ownership capabilities (e.g., ability to select the time period of the shared talkgroup, the number of devices that may be added to the shared talkgroup, terminate the talkgroup share at any time, and other suitable capabilities) without having to rekey all talkgroups and devices once the sharing of a talkgroup is terminated, as discussed below.

Figure 4:
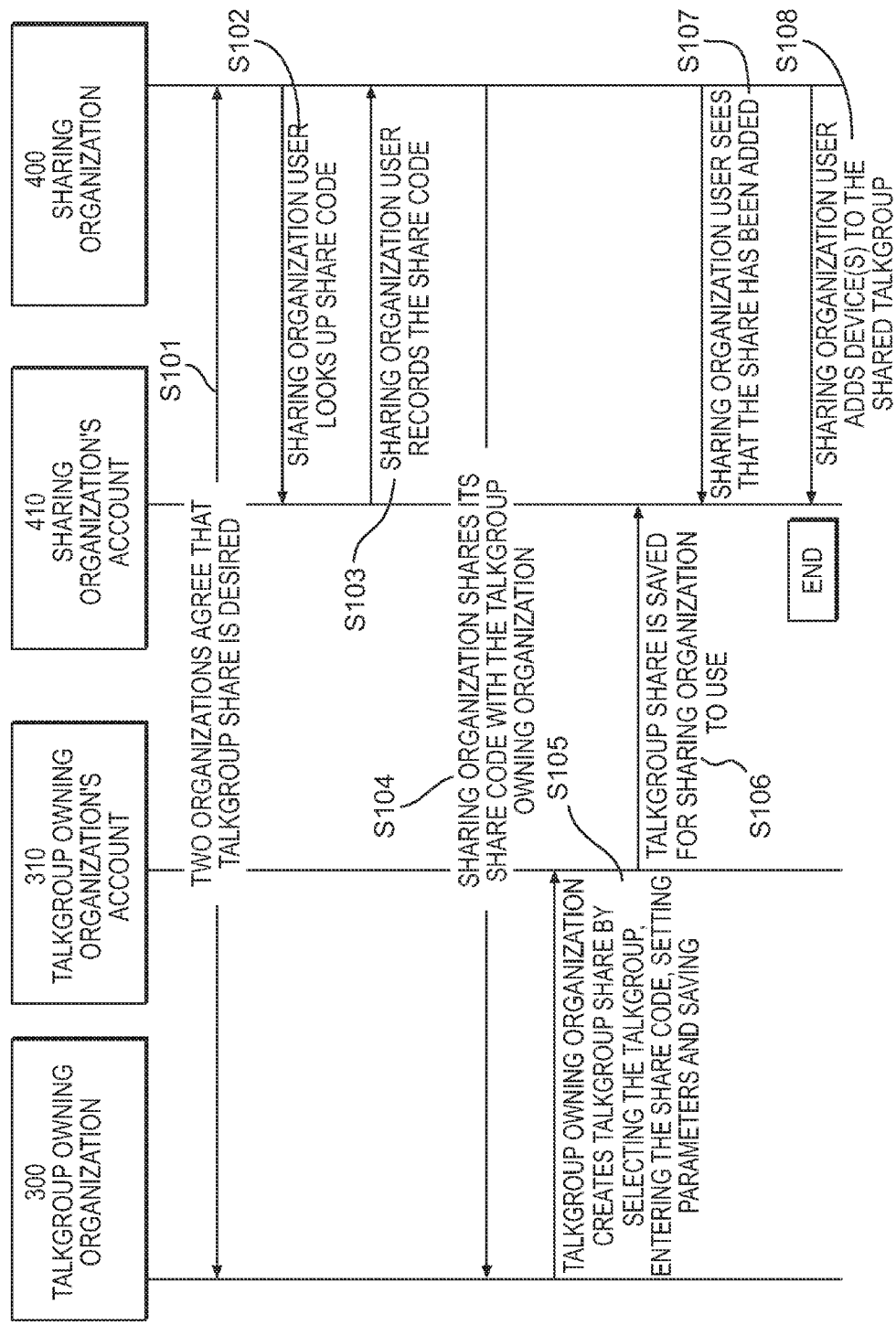
FIG. 4 is a flow chart illustrating a method for sharing a talkgroup, in accordance with particular implementations of the present disclosure.

Referring now to FIG. 4, a flow chart of an example of a method for enabling the sharing of a talkgroup between two different organizations now is described. The method may be described as being performed by system 200 of FIG. 10. In some examples, operation hub 130 of FIG. 2 may be implemented as system 200 of FIG. 10, system, such as operation hub 130 for example, may maintain a plurality of accounts (e.g., PTT service subscriber accounts), and each account may correspond to a different organization or group. For example, operation hub 130 may maintain a first account (e.g., talkgroup owning organization's account 310) for a first organization (e.g., talkgroup owning organization 300) and a second account (e.g., sharing organization's account 410) for a second organization (e.g., sharing organization 400). Talkgroup owning organization's account 310, for example, may indicate which talkgroups are assigned to talkgroup owning organization 300. Similarly, sharing organization's account 410 may indicate which talkgroups are assigned to sharing organization 400. In particular implementations, talkgroup owning organization's account 310 may indicate which talkgroups are being shared by talkgroup owning organization 300 and which organizations, users, or communication devices outside of talkgroup owning organization 300 are permitted to access talkgroups assigned to talkgroup owning organization 300. Similarly, sharing organization's account 410 may indicate which talkgroups are being shared by other organizations, such as talkgroup owning organization 300 for example, for use by sharing organization 400 or users or devices affiliated with sharing organization 400. With reference to FIGS. 3A-3B, talkgroup owning organization 300 may correspond to the fire-fighting organization and sharing organization 400 may correspond to the police-responder organization 300, for example.

In S101, the first organization agrees to share a talkgroup assigned to the first organization with the second organization. For example, talkgroup sharing organization 400 may request that talkgroup owning organization 300 share a talkgroup that is assigned to talkgroup owning organization 300 with talkgroup sharing organization 400 to enable members of talkgroup sharing organization 400 to communicate with members of the talkgroup owning organization 300 within a shared talkgroup, and the talkgroup owning organization 300 may agree. This request and consent may occur out-of-band or otherwise outside of the PTT communication system. In particular implementations, the first and second organizations may agree that a talkgroup is to be shared without determining which talkgroup is to be shared. In other implementations, the first and second organizations may agree that a particular talkgroup is to be shared.

Thereafter, in S102, talkgroup sharing organization 400 accesses system 200 (described below in more detail) and requests a sharecode that identifies or otherwise is related to talkgroup sharing organization. For example, an administrator of talkgroup sharing organization 400 may access an interface (e.g., using a device 120 to access a web interface internally sourced or through a third party) to connect to a talkgroup sharing module 210 (described below in more detail) and to request, via an input/output ("I/O") device 206 (described below in more detail), a share code.

Subsequently, in S103, talkgroup sharing module 210 generates (or retrieves a previously generated) sharecode (e.g., a unique and/or randomly or pseudo-randomly generated code associated with the talkgroup sharing organization 400) and sends the sharecode to talkgroup sharing organization 400, e.g., via I/O device 206. Talkgroup sharing organization 400 then may record the sharecode. In some implementations, the sharecode generated (or retrieved) by talkgroup sharing module 210 for talkgroup sharing organization 400 only may be valid for a defined period of time (e.g., 10 minutes, 1 hour, 1 day, etc. from the time the sharecode is generated). Additionally or alternatively, in some implementations, talkgroup sharing module 210 may require talkgroup sharing organization 400 to authenticate itself before generating and/or sending a sharecode to the talkgroup sharing organization 400. For example, talkgroup sharing module 210 may require talkgroup sharing organization 400 to provide a username and password pair to authenticate talkgroup sharing organization 400. In such an implementation, talkgroup sharing module 210 may generate and/or send a sharecode to the talkgroup sharing organization 400 only after successfully authenticating talkgroup sharing organization 400.

Figure 5A:
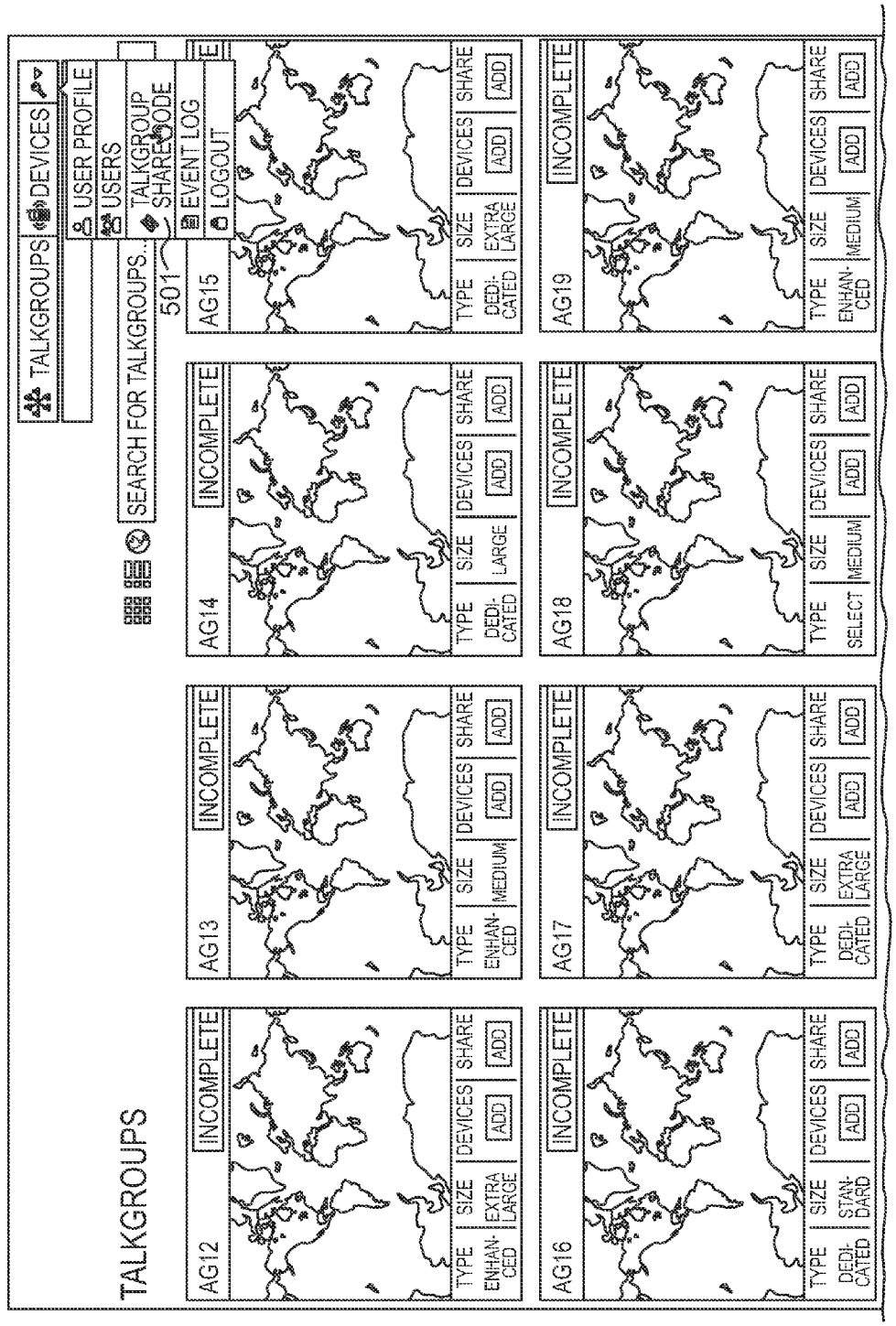
FIG. 5A is a schematic diagram showing an interface for requesting a sharecode, in accordance with particular implementations of the present disclosure.
Figure 5B:
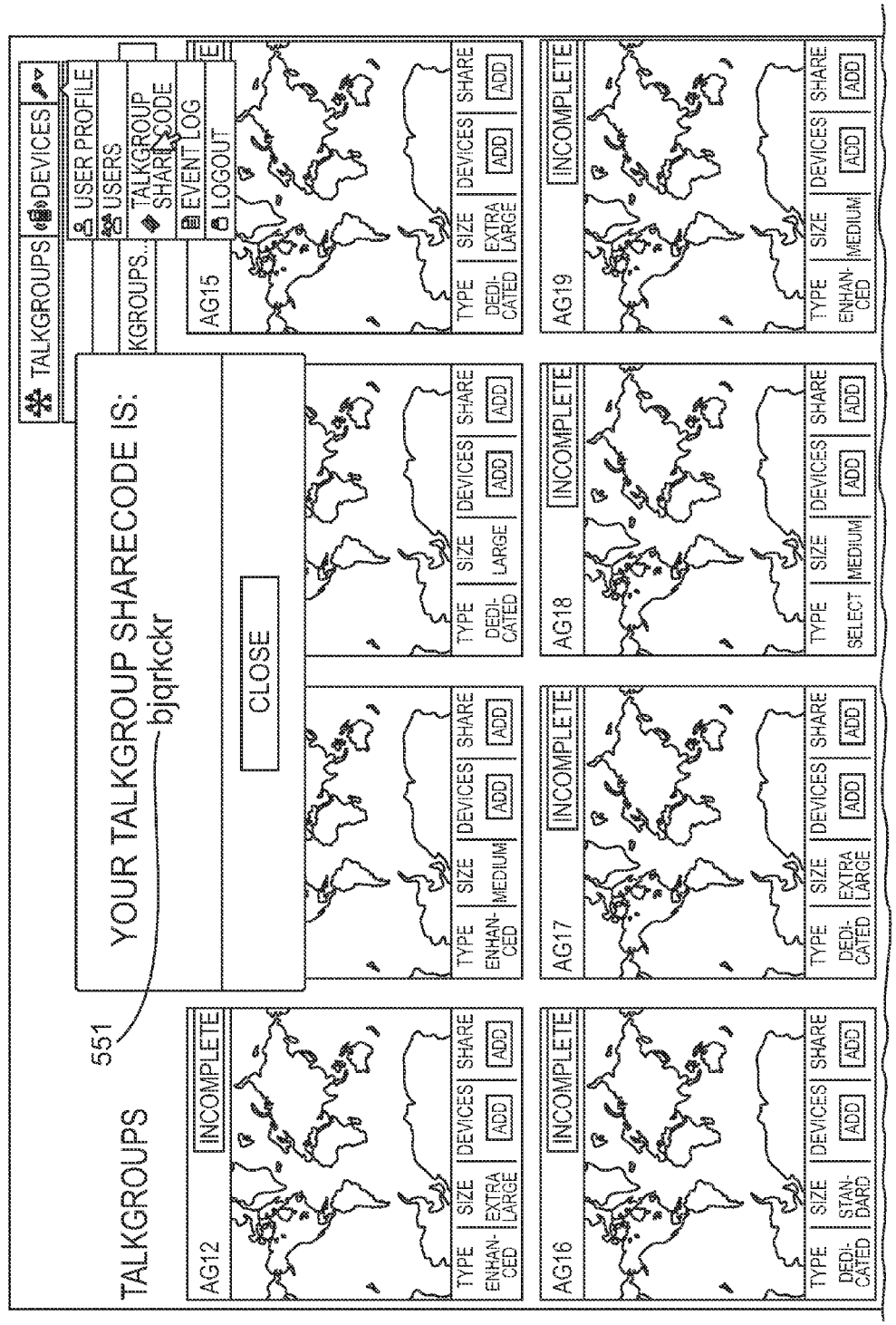
FIG. 5B is a schematic diagram showing a notification including the sharecode requested via the interface of FIG. 5A, accordance with particular implementations of the present disclosure

FIGS. 5A-5B show, from a user's perspective, an example of the processes S102 of requesting a sharecode and S103 of generating or retrieving a sharecode, which may be performed, for example, via device 120. In FIG. 5A, a user from talkgroup sharing organization (e.g., an administrator of talkgroup sharing organization using device 120) 400 may request a sharecode (e.g., S102) by selecting a talkgroup sharecode command 501. In FIG. 5B, a sharecode 551 may be provided (e.g., S103) to the user, for example, through a pop-up display window. In various implementations, sharecode 551 may be provided to the user in different manners, such as, for example, by e-mail, by audio message, by transmission to a communication device, or by any other means. In some configurations, S103 may be omitted, and the sharecode may be shared directly with talkgroup owning organization 300 after S102 in a manner similar to S104 described below.

After receiving the sharecode in S103, talkgroup sharing organization 400 shares its sharecode with talkgroup owning organization 300 in S104. In some implementations, talkgroup sharing organization 400 may share the sharecode with talkgroup owning organization 300 without utilizing resources or other infrastructure available from or in association with system 200. For example, an administrator of talkgroup sharing organization 400 may share the sharecode with an administrator of talkgroup owning organization 300 via telephone or email. Alternatively, in other cases, the system 200 may provide resources to facilitate the sharing of the sharecode by talkgroup sharing organization 400 with talkgroup owning organization 300.

In S105, talkgroup owning organization 300 sends the sharecode received from talkgroup sharing organization 400 to talkgroup sharing module 210 and instructs talkgroup sharing module 210 to initiate the sharing of one or more talkgroups assigned to talkgroup owning organization 300 with talkgroup sharing organization 400. Talkgroup sharing module 210 may use the sharecode received from talkgroup owning organization 300 to identify the other organization with whom talkgroup owning organization 300 desires to share one or more talkgroups—in this case talk-group sharing organization 400. For example, talkgroup sharing module 210 may compare the sharecode received from talkgroup owning organization 300 to data stored in a data store to determine that talkgroup owning organization 300 desires to share one or more talkgroups with talkgroup sharing organization 400.

In implementations in which a sharecode is valid only for a limited time, talk-group sharing module 210 only may grant or otherwise act upon the request to share one or more talkgroups received in S105 if the sharecode received from talkgroup owning organization 300 is valid. For example, if the sharecode provided to talkgroup sharing organization 400 by talkgroup sharing module 210 only was valid for a period of 1 hour after being generated, and talkgroup sharing module 210 receives the sharecode for talkgroup sharing organization 400 from talkgroup owning organization 300 more than one hour after it was generated, talkgroup sharing module 210 may not initiate the sharing of the one or more talkgroups as requested by talkgroup owning organization 300 and/or may be unable to identify talkgroup sharing organization 400 as the organization with which talkgroup owning organization 300 desires to share one or more talkgroups.

Additionally or alternatively, in some implementations, talkgroup sharing module 210 may require talkgroup owing organization 300 to authenticate self before talkgroup sharing module 210 enables talkgroup owning organization 300 to request to share one or more talkgroups and/or before talkgroup sharing module 210 acts upon a request from talkgroup owning organization 300 to share the one or more talk-groups with the talkgroup sharing organization 400. For example, talkgroup sharing module 210 may require talkgroup owning organization 300 to provide a username and password pair to authenticate talkgroup owning organization 300. In such an implementation, talkgroup sharing module 210 may enable talkgroup owning organization 300 to request to share one or more talkgroups and/or act upon a request to share one or more talkgroups from talkgroup owning organization 300 only after successfully authenticating talkgroup owning organization 300.

As part of the request to initiate the sharing of one or more talkgroups assigned to talkgroup owning organization 300 with talkgroup sharing organization 400, talk-group owning organization 300 may specify the particular talkgroup(s) to be shared with talkgroup sharing organization 400. Talkgroup owning organization 300 also may set certain parameters related to the sharing of the talkgroup(s) with talkgroup sharing organization 400. In some implementations, talkgroup sharing module 210 may enable talkgroup owning organization 300 to set a time period so as to limit the sharing of the talkgroup(s) to a defined tune period. For example, talkgroup sharing module 210 may enable talkgroup owning organization 300 to specify a start date and start time and a corresponding end date and end time that define the time period during which the talkgroup(s) will be shared talkgroup sharing organization 400. The parameters related to the sharing of the talkgroup(s) that talkgroup owning organization 300 can set also may include the number of devices associated with talkgroup sharing organization 400 allowed to participate in a talkgroup shared by the talkgroup owning organization 300 with the talkgroup sharing organization 400. Additionally or alternatively, talkgroup sharing module 210 may enable talkgroup owning organization 300 to set limits on the operation and/or functionality of devices associated with the talkgroup sharing organization 400 when participating in a talkgroup shared by the talkgroup owning organization 300 (e.g., devices associated with the talkgroup sharing organization 400 may be allowed to participate in a talkgroup shared by the talkgroup owning organization 300 in a receive only mode, in which they have no ability to transmit in the shared talkgroup).

Figure 6A:
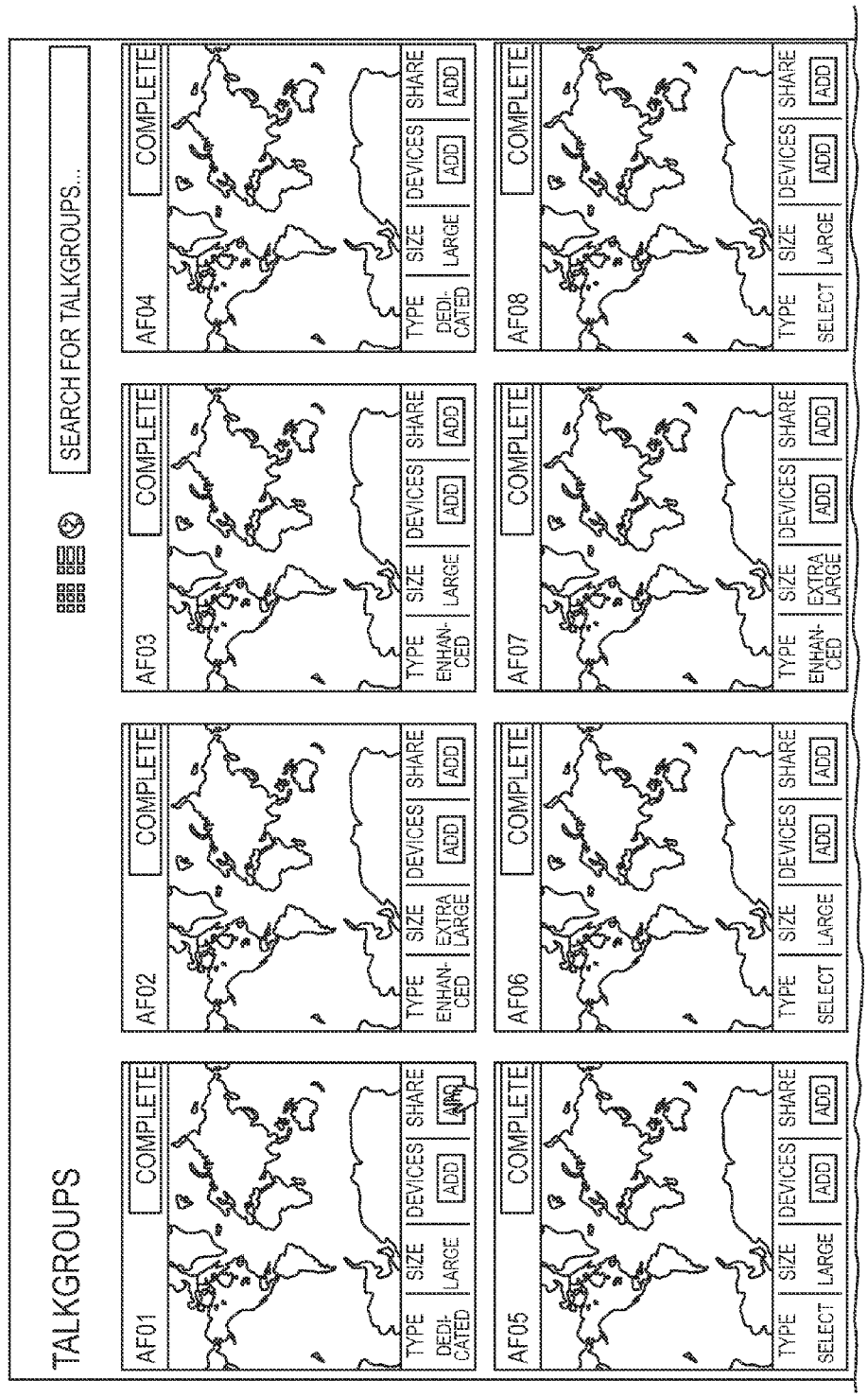
FIG. 6A is a schematic diagram showing a plurality of talkgroups assigned to a talkgroup owning organization, in accordance with particular implementations of the present disclosure.
Figure 6B:
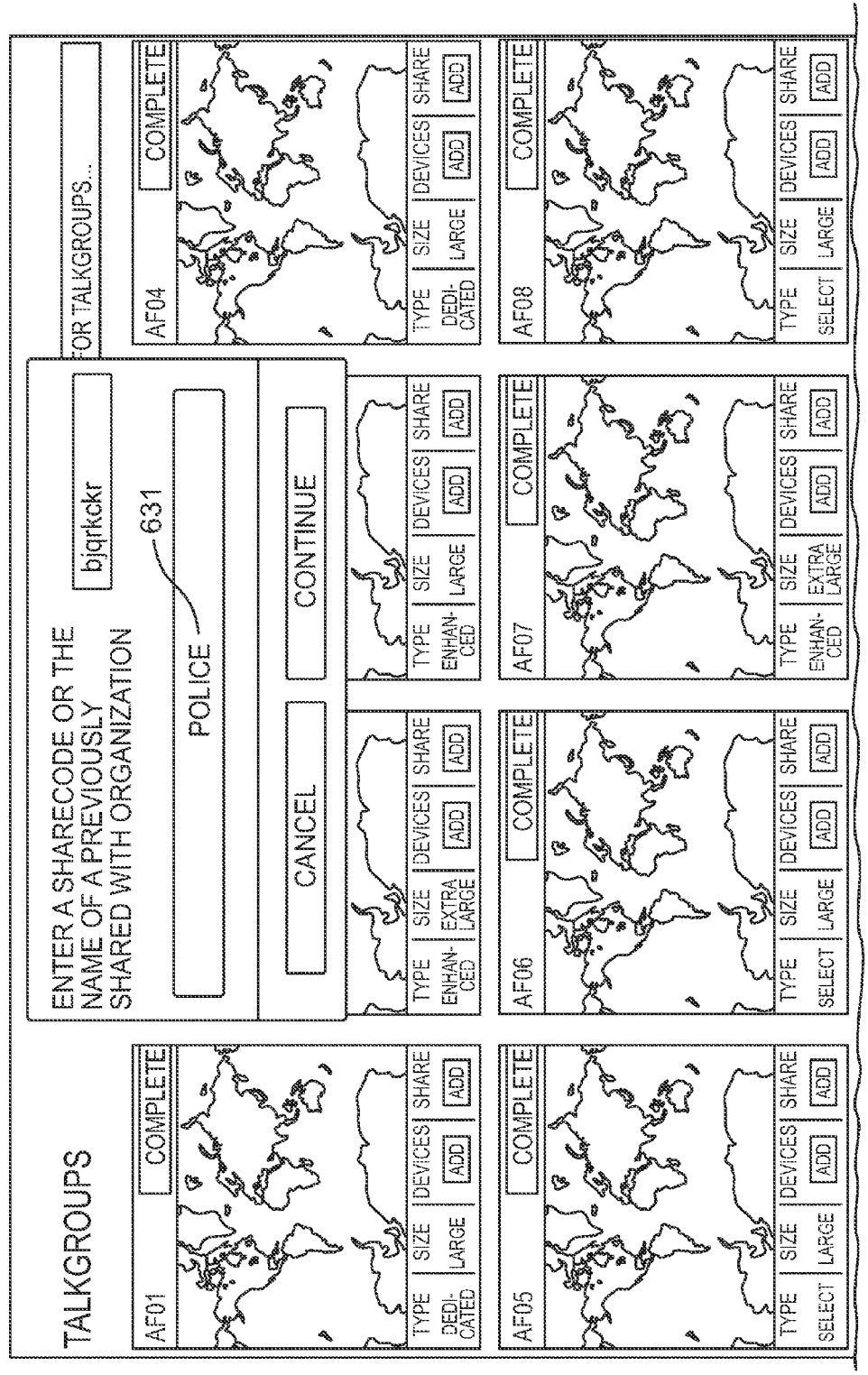
FIG. 6B is a schematic diagram showing an interface for entering a sharecode, in accordance with particular implementations of the present disclosure.
Figure 6C:
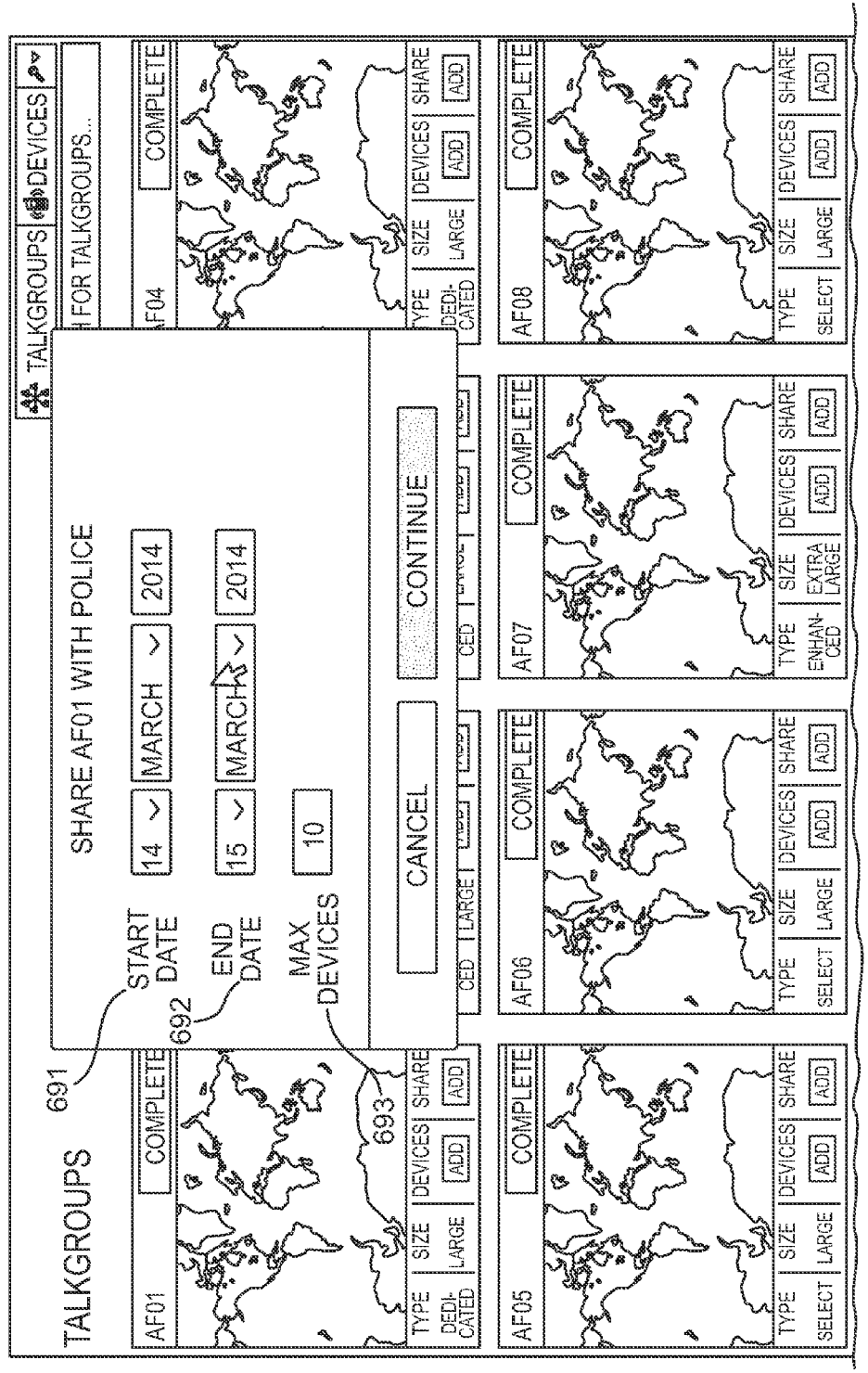
FIG. 6C is a schematic diagram showing an interface for entering talkgroup sharing parameters, in accordance with particular implementations of the present disclosure.

FIGS. 6A-6D show, from a user's perspective, an example of the processes S105 of sending a sharecode received from a talkgroup sharing organization to a talkgroup sharing module and instructing the talkgroup sharing module to initiate the sharing of one or more talkgroups assigned to a talkgroup owning organization with the talkgroup sharing organization, which may be performed, for example, via device 120. For example, as shown in FIG. 6A, a plurality of talkgroups (e.g., talkgroups AF01, AF02, AF03, AF04, AF05, AF06, AF07, AF08) may be assigned to talkgroup owning organization 300. In S105, talkgroup owning organization 300 may select one or more of these talkgroups to share with talkgroup sharing organization 400. Specifically, FIG. 6A shows a situation in which talkgroup owning organization 300 selects talkgroup AF01 as a talkgroup to be shared (e.g., by selecting the Share "Add" button illustrated in FIG. 6A). After selecting a talkgroup to be shared, talkgroup owning organization 300 may be prompted to enter the sharecode received in S104, as shown in FIG. 6B. Alternatively, it talkgroup owning organization 300 has previously entered a sharecode associated with talkgroup sharing organization 400, talkgroup owning organization 300 may be provided with the option to select an identifier (e.g., identifier 631 indicating "Police") identifying talkgroup sharing organization 400 and associated with the sharecode, rather than directly entering the sharecode. Thereafter, as shown in FIG. 6C, talkgroup owning organization 300 may specify various parameters related to the talkgroup share, such as, for example, a start date 691 indicating when communication devices affiliated with talkgroup sharing organization 400 will be able to start accessing the shared talkgroup, an end date 692 indicating when communication devices affiliated with talkgroup sharing organization 400 will no longer be able to access the shared talkgroup, and a maximum number of devices 693 indicating the maximum number of devices affiliated with talkgroup sharing organization 400 that talkgroup sharing organization 400 may provision to access the shared talkgroup. In some implementations, for as long as talkgroup owning organization 300 continues to share the shared talkgroup with talkgroup sharing organization 400, talkgroup owning organization 300 may be able to change these parameters. However, in some implementations, talkgroup owning organization 300 may be prevented from reducing the maximum number of devices that talkgroup sharing organization 400 may provision to access the shared talkgroup below the number of devices that talkgroup sharing organization 400 already has provisioned to participate in the shared talkgroup.

Figure 6D:
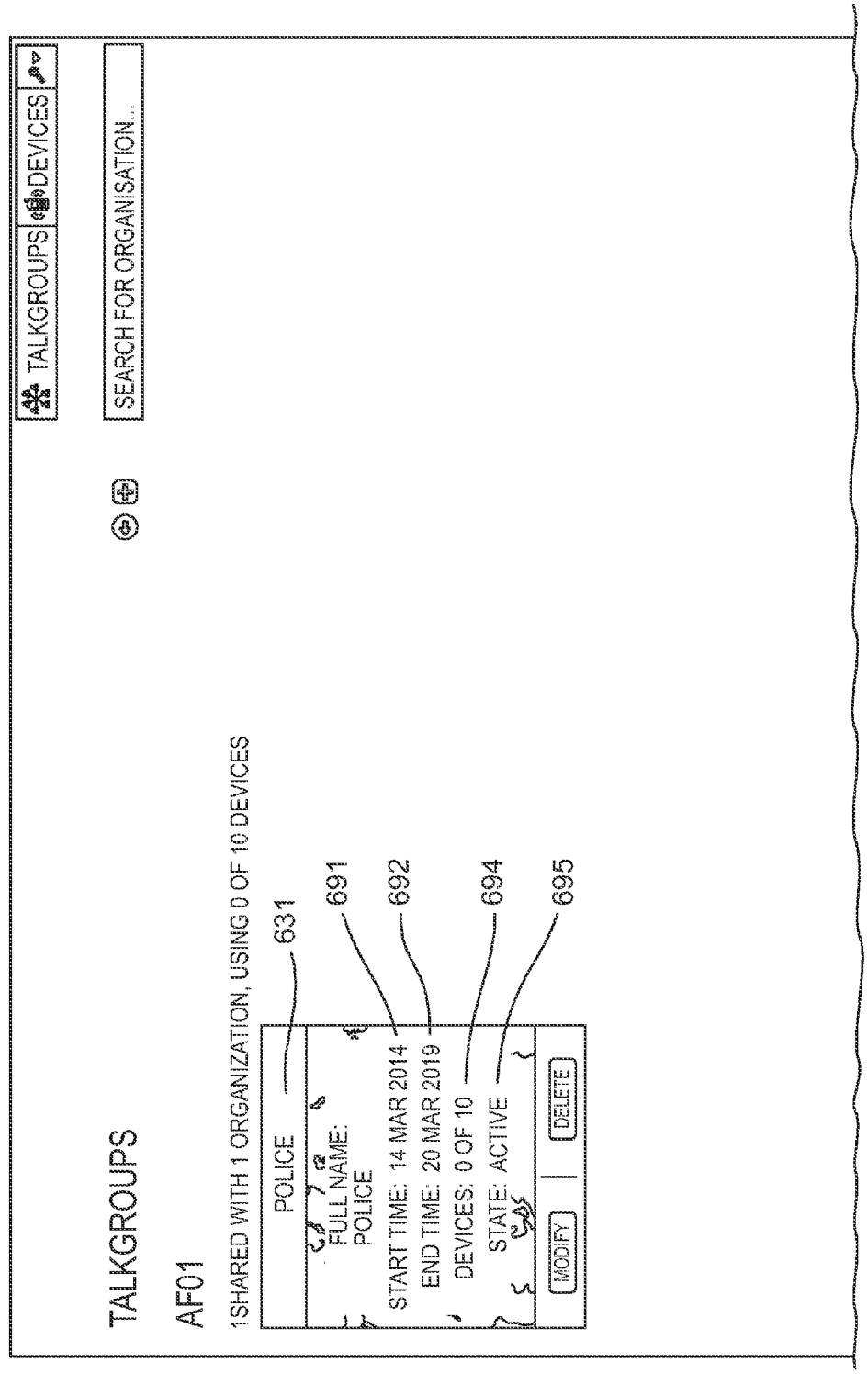
FIG. 6D is a schematic diagram showing an informational display of shared talkgroups presented to the talkgroup owning organization, in accordance with particular implementations of the present disclosure.

FIG. 6D shows an example informational display presented to an administrator or other user affiliated with talkgroup owning organization 300 after specifying the parameters related to the talkgroup share as shown in FIG. 6C. Specifically, the informational display shown in FIG. 6D identifies the talkgroup being shared (e.g., talkgroup AF01), the talkgroup sharing organization 400 (e.g., identifier 631 indicating "Police"), start date. 691 end date 692, the number of devices 694 affiliated with talkgroup sharing organization 400 that talkgroup sharing organization has provisioned to be able to access the shared talkgroup, and the share state 695 of the talkgroup indicating whether the talkgroup currently is being shared with any other organization. In particular implementations, a subset of this information or even different information may be identified.

In S106, in response to receiving the request to initiate the sharing of one or more talkgroups assigned to talkgroup owning organization 300 with talkgroup sharing organization 400, talkgroup sharing module 210 makes the shared talkgroup(s) available to talkgroup sharing organization 400, thereby enabling talkgroup sharing organization 400 to configure one or more communication devices affiliated with talkgroup sharing organization 400 to access the one or more shared talkgroups. For example, talkgroup sharing module 210 may notify talkgroup sharing organization 400 that members of talkgroup sharing organization 400 may participate in the shared talkgroup(s). In some implementations, system 200 may maintain one or more databases that store information about talkgroups currently maintained on behalf of different organizations. In such implementations, when talkgroup owning organization 300 makes the shared talkgroup(s) available to talkgroup sharing organization 400, system 200 may update the databases) to reflect that talkgroup owning organization 300 has shared the shared talkgroup(s) with talkgroup sharing organization 400. Thereafter, when talkgroup sharing organization 400 accesses system 200 for information about talkgroups currently available to talkgroup sharing organization 400, system 200 may access the database(s), determine that the shared talkgroup(s) have been shared with talkgroup sharing organization 400, and inform talkgroup sharing organization 400 that the shared talkgroup(s) have been shared with talkgroup sharing organization 400.

Figure 7:
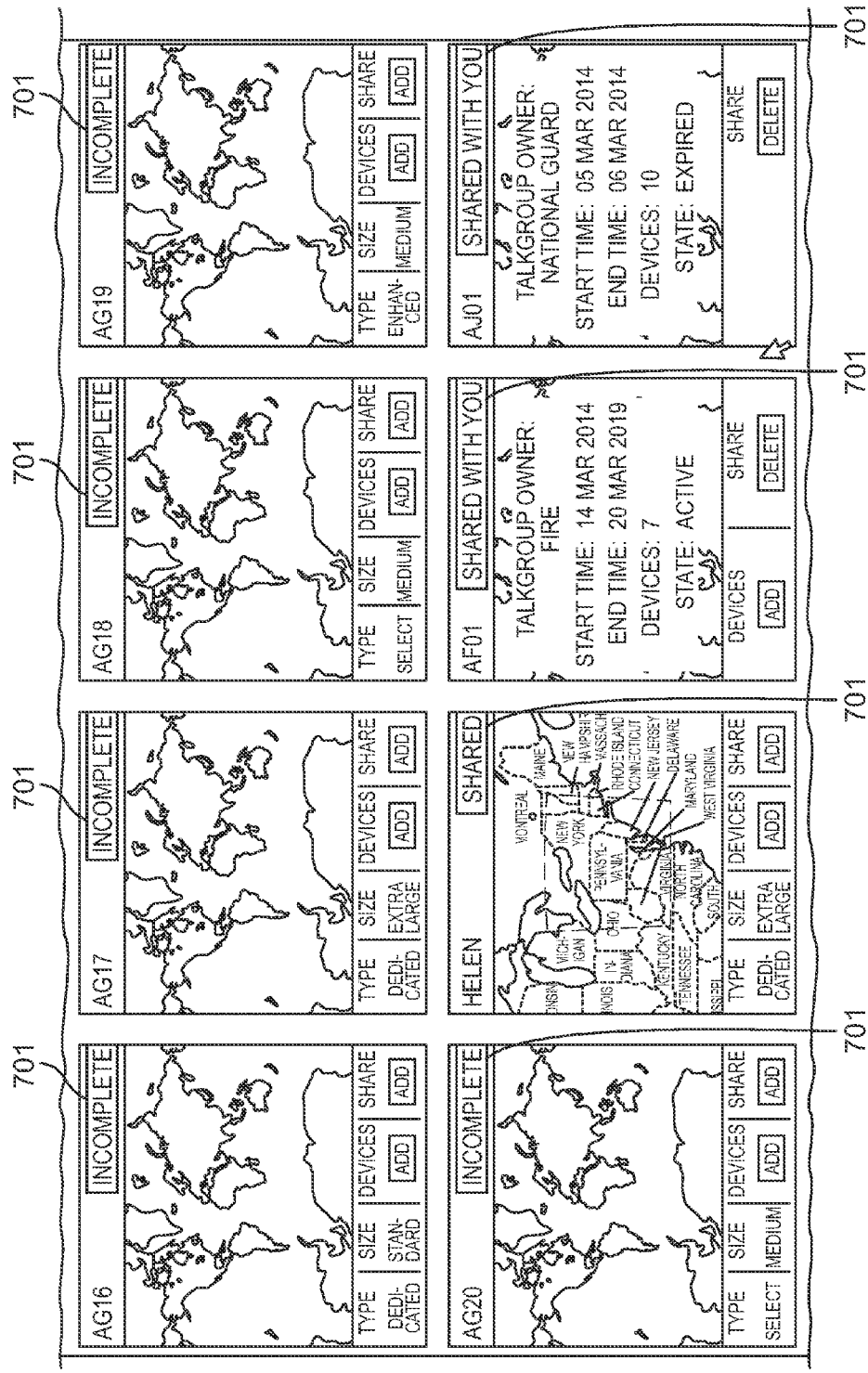
FIG. 7 is a schematic diagram showing an informational display presented to a talkgroup sharing organization, in accordance with particular implementations of the present disclosure.

In S107, talkgroup sharing organization 400 may be notified that talkgroup owning organization 300 has shared a talkgroup with talkgroup sharing organization 400. For example, as shown in FIG. 7, talkgroup sharing organization 400 may view a list of talkgroups assigned to talkgroup sharing organization 400, similar to the list of talkgroups assigned to talkgroup owning organization 300 shown in FIG. 6A. In addition to talkgroups assigned to talkgroup sharing organization 400 (e.g., talkgroups AG16, AG17, AG18, AG19, AG20, and Helen), the list of talkgroups also may include talkgroups shared with talkgroup sharing organization 400 by other organizations (e.g., talkgroups AF01, AF01) and information about the sharing parameters for such talkgroups (e.g., identifier of the talkgroup owner 731, start date 691 for sharing the talkgroup, end date 692 for ending sharing of the talkgroup, maximum number of devices 693 that talkgroup sharing organization 400 may provision to participate in the talkgroup, and the share state 695 of the talkgroup).

In addition, each of the talkgroups in the list of talkgroups may include an indicator 701 that indicates a state of the talkgroup. For example, the indicator "Incomplete" may indicate that talkgroup sharing organization 400 has not completed the setup of the talkgroup, the indicator "Shared" may indicate that talkgroup sharing organization 400 is currently sharing the talkgroup with another organization, and the indicator "Shared with you" may indicate that a talkgroup owning organization 300 has shared the talkgroup with talkgroup sharing organization 400. In particular implementations, a subset of this information or even different information may be identified.

Returning to FIG. 4, in S108, sharing organization 400 may request, that talkgroup sharing module 210 cause one or more communication devices affiliated with sharing organization 400 to be provisioned to be able to access the talkgroup(s) shared with talkgroup sharing organization 400 by talkgroup owning organization 300. For example, talkgroup sharing organization 400 may request that talkgroup sharing module 210 add a number of communication devices associated with talkgroup sharing organization 400, e.g., up to a maximum number of communication devices set by talkgroup owning organization 300, to a shared talkgroup. In response, talkgroup sharing module 210 may cause the specified communication devices associated with the talkgroup sharing organization 400 to be provisioned to be able to access the shared talkgroup(s). Thereafter, the specified communication devices may be able to access and participate in the shared talkgroup(s). For example, graphical user interfaces (GUIs) rendered on the specified communication devices may identify the shared talkgroup(s) as talkgroups that are accessible from the specified communication devices and enable users of the specified communication devices to participate in the shared talkgroup(s).

Figure 8A:
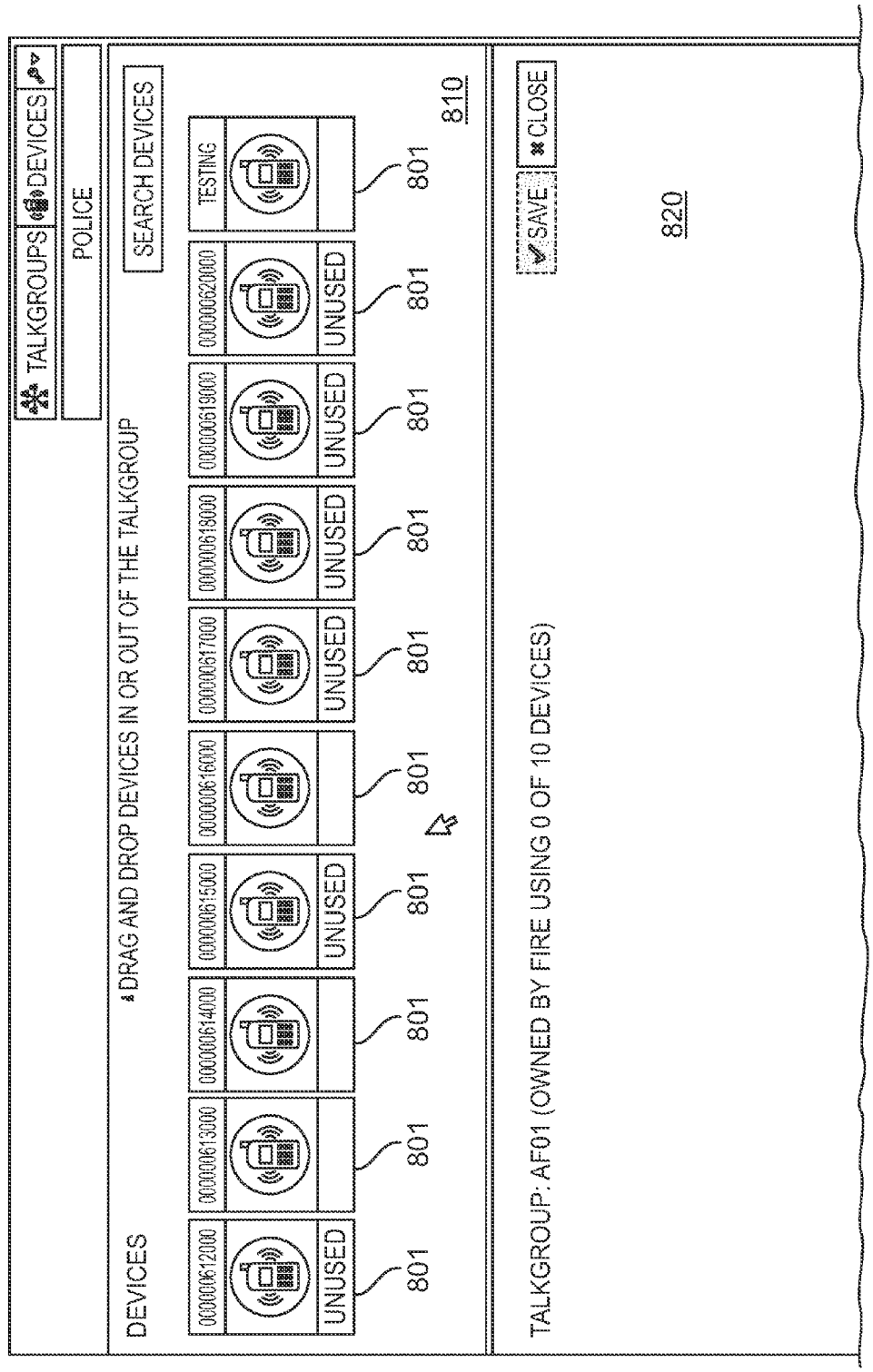
FIG. 8A is a schematic diagram showing an interface for the talkgroup sharing organization to add communication devices to a shared talkgroup prior to adding communication devices to the shared talkgroup, in accordance with particular implementations of the present disclosure.
Figure 8B:
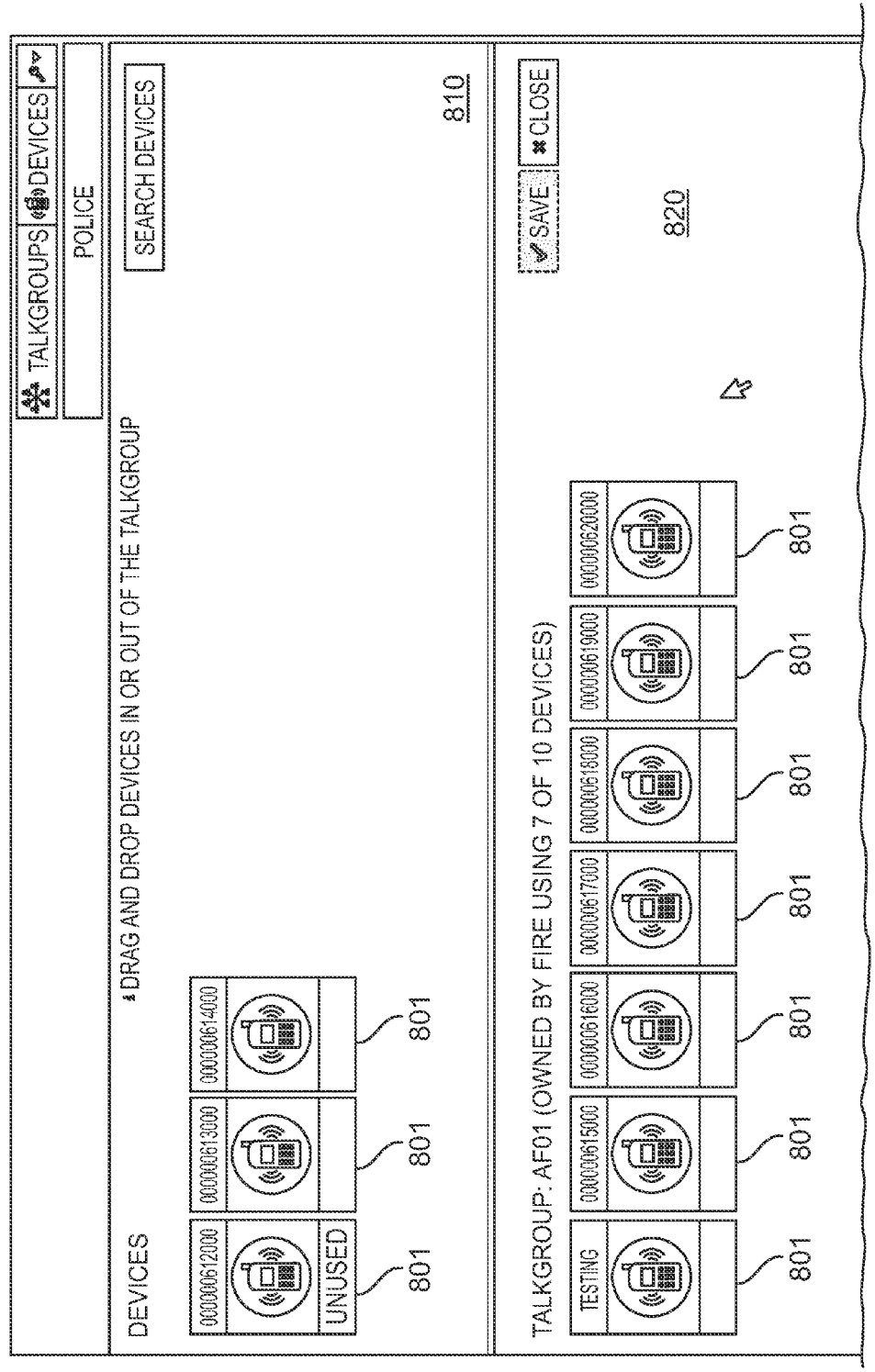
FIG. 8B is a schematic diagram showing the interface of FIG. 8A after adding communication devices to the shared talkgroup, in accordance with particular implementations of the present disclosure.

FIGS. 8A-8B show an example interface for enabling an administrator of a tall group sharing organization to add communication devices to one or more talkgroups shared with the talkgroup sharing organization by a talkgroup owning organization, for example, as described above in connection with S108 of FIG. 4, which may be accessed, for example, via device 120.

In particular, FIGS. 8A-8B show the interface for enabling talkgroup sharing organization 400 (e.g., "Police") to add communication devices to shared talkgroup AF01. Initially, icons 801 representing communication devices affiliated with talkgroup sharing organization 400 are located in an available device area 810, as shown in FIG. 8A. A user or administrator from talk-group sharing organization 400 may move (e.g., "drag and drop") one or more icons 801 (e.g., up to the maximum number of devices 693 for the talkgroup) to talkgroup registration area 820 to register the corresponding one or more communication devices with talkgroup AF01, as shown in FIG. 8B. While the example process of registering devices with a shared talkgroup shown in FIGS. 8A-8B is performed using graphical manipulation, registration of communication devices with a talkgroup is not so limited and may be performed using various processes, such as inputting names or other identifiers of communication devices, selecting communication devices within a geographic region, selecting communication devices operated by particular users, performing operations on the communication devices themselves, or any other means of registering communication devices. Moreover, in particular implementations, communication devices affiliated with talkgroup sharing organization 400 may be freely added to or dropped from the shared talkgroup so long as the number of devices participating in the shared talkgroup at any one time does not exceed the maximum number of devices 693 allowed by talkgroup owning organization 300. In certain implementations, communication devices affiliated with talkgroup sharing organization 400 may be added to or dropped from the shared talkgroup only a limited number of times.

In some implementations, one or both of sharing organization 400 and talkgroup owning organization 300 can instruct talkgroup sharing module 210 to terminate the sharing of a shared talkgroup at any time and, in response, talkgroup sharing module 210 may terminate the sharing of the shared talkgroup.

Figure 9:
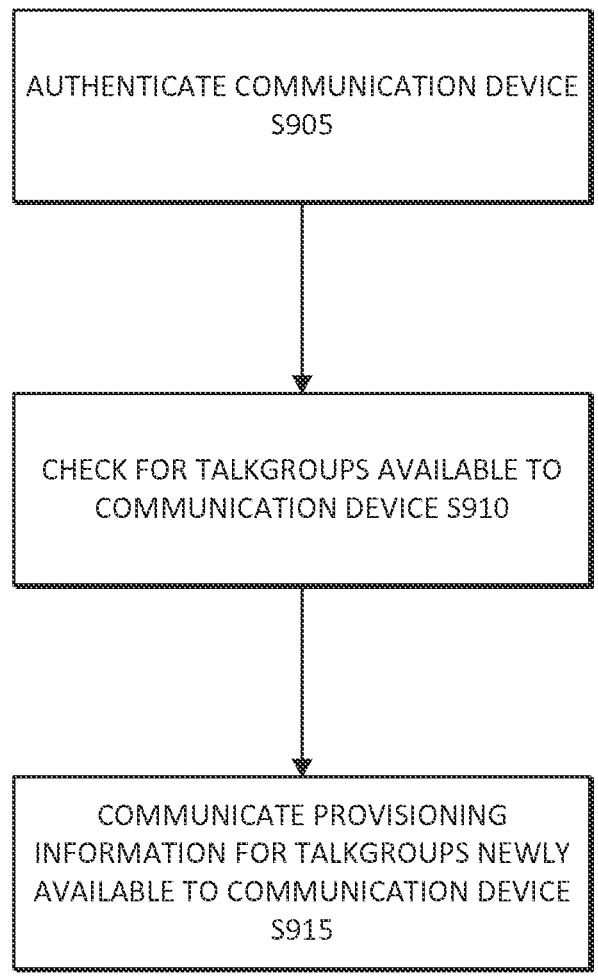
FIG. 9 is a flow chart illustrating a method for provisioning a communication device to access a shared talkgroup.

Referring now to FIG. 9, a flow chart of an example of a method for provisioning a communication device to access a shared talkgroup now is described. The method may be described as being performed by operation hub 130. Operation hub 130 may maintain information about talkgroups that currently are available to an individual communications device (e.g., in a database). When a talkgroup is shared with a particular communications device, operation hub 130 may update the information to indicate that the shared talkgroup now is available to the particular communications device. Thereafter, operation hub 130 may communicate with the particular communications device to provide the particular communication device to be able to access the shared talkgroup, for example, as illustrated in FIG. 9.

At S905, operation hub 130 authenticates the particular communication device. In some implementations, the sharing of the talkgroup with the particular communication device may trigger operation hub 130 to transmit a communication to the particular communication device, for example, informing the particular communication device that an update is available for the particular communication device, and the particular communication device may respond to operation hub 130 and attempt to authenticate itself to operation hub 130. Additionally or alternatively, in some implementations, the particular communication device occasionally (e.g., periodically) may check in with operation hub 130 to see if any updates are available for the particular communications device. In such implementations, operation hub 130 may request that the particular communication device authenticate itself before operation hub 130 will respond to the particular communication device's request to check for updates.

Depending on the implementation, different techniques may be used to authenticate the particular communication device. For example, in some implementations, the particular communication device may transmit its IMEI to operation hub 130, and operation hub 130 may authenticate the particular communication device by matching the received IMEI with information available to operation hub 130. In alternative implementations, the particular communication device may transmit another unique identifier and/or key that operation hub 130 may use to authenticate the particular communication device.

After the particular communication device has been authenticated, at S910, operation hub 130 checks to determine which talkgroups currently are available to the particular communication device. If operation hub 130 determines that there are talkgroups that are newly available to the particular communication device (e.g., because a talkgroup has been shared with the particular communication device since the last time the particular communication device was updated), at S915, operation hub 130 may communicate provisioning information for the talkgroups that are newly available to the particular communication device to the particular communication device. For example, in some implementations, fir each talkgroup newly available to the particular communication device, operation hub 130 may transmit the name of the newly available talkgroup and one or more keys that enable the particular communication device to participate in (e.g., transmit and/or receive communications) the newly available talkgroup.

Figure 10:
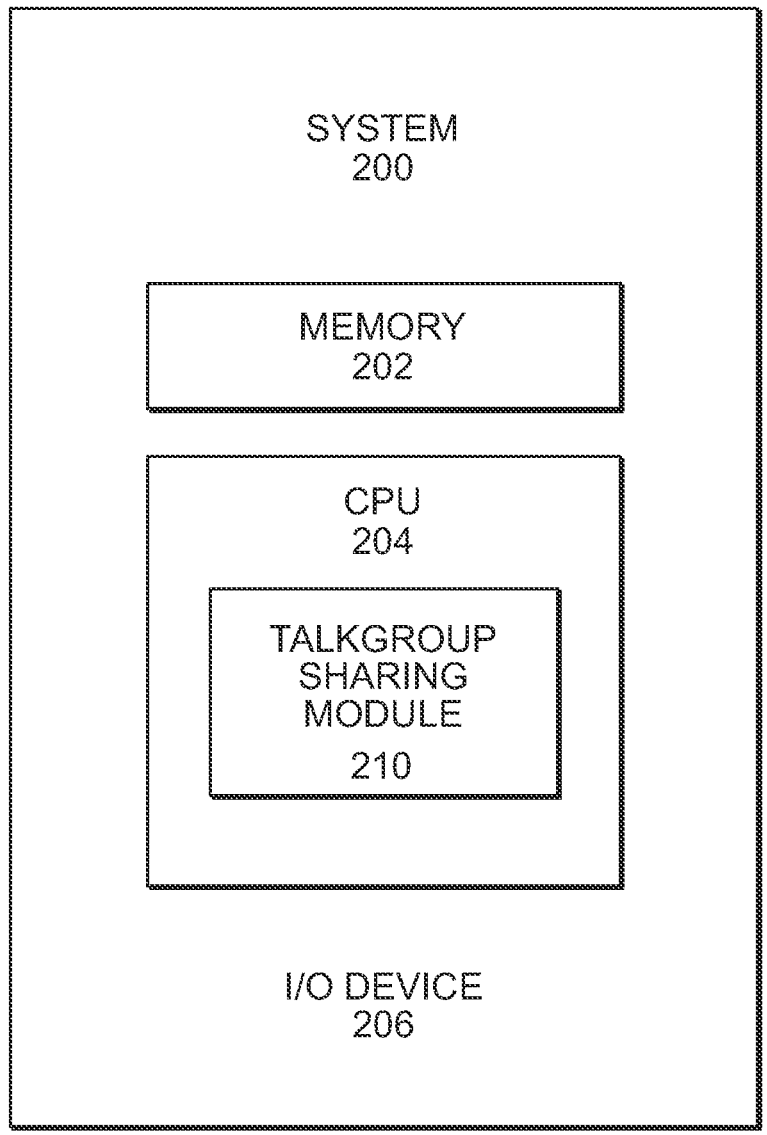
FIG. 10 is a block diagram of a system configured to implement a talkgroup sharing process, in accordance with particular implementations of the present disclosure.

Referring now to FIG. 10, system 200, which provides an example of a talkgroup sharing module, is now described. In particular implementations, system 200 may reside within operation hub 130. In other implementations, system 200 may be separate from operation hub 130. In certain implementations system 200 may be integrated with one or more of satellites 110, satellite links 115, devices 120, gateways 135, or communication devices 150. In still other implementations, system 200 may reside within cloud 140. As illustrated in FIG. 10, system 200 includes a memory 202, a central processing unit ("CPU") 204, and I/O device 206.

Memory 202 stores computer-readable instructions that, when executed, instruct system 200 to perform certain processes. Memory 202 may comprise, for example, RAM, ROM, EPROM, EEPROM, flash memory, or any suitable combination thereof. When executed by CPU 204, the computer-readable instructions stored in memory 202 instruct CPU 204 to implement one or more modules, such as a talkgroup sharing module 210, for example. For example, when executed by CPU 204, the computer-readable instructions stored in memory cause CPU 204 to implement talkgroup sharing module 210. Talkgroup sharing module 210 may perform a plurality of functions including, but not limited to, generating talkgroup sharecodes, managing talkgroup accounts, providing notifications, and terminating talkgroups, as described above in more detail.

I/O device 206 may receive one or more of data from network 100, data from other devices connected to system 200, and input from a user, and I/O device 206 may provide such information to CPU 204. I/O device 206 may transmit data to network 100, may transmit data to other devices connected to system 200, and may render information to a user (e.g., display the information via a display device).

The flowchart and block diagrams in FIGS. 1-10 illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, as used herein, the term "user" is intended to refer to one or more of a person, an organization, a computer, or any other entity, apparatus, device, or system.

For example, the terms "communication device," "communication system," "device," and "system" may generally refer to and include satellites 110, satellite links 115, operation hubs 130, devices or systems connected with clouds 140, devices 120, gateways 135, communication devices 150, or any other devices or systems that facilitate the communication of information. Moreover, the terms "management center," "management device," and "management system" may generally refer to and include satellites 110, satellite links 115, operation hubs 130, devices or systems connected with clouds 140, devices 120, gateways 135, communication devices 150, or any other devices or systems that facilitate managing the communication of information.

Aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to satellite communications, wireless, wireline, optical fiber cable, RF signals, etc., or any suitable combination of the foregoing.

Computer program code for carrying out operations for aspects of the present disclosure may be written in any combination of one or more programming languages, including an object oriented programming language, such as JAVA, C++, C#, or other suitable programming languages. The program code may execute entirely on a user's device, partly on a user's device, as a stand-alone software package, partly on a user's device and partly on a remote computer, or entirely on a remote computer or server. In the latter scenario, a remote computer may be connected to a user's device through any type of network, including a satellite communications network, a local area network ("LAN"), or a wide area network ("WAN"), or the connection may be made to an external computer (for example, through the Internet using an Internet Service Provider) or offered as a service, such as, for example, a Software as a Service ("SaaS"), e.g., over a secure web interface via a https connection.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

While the techniques and implementations disclosed herein have generally been described in the context of satellite-based PTT communication, such techniques and implementations may readily be applied to other communication systems. For example, the techniques and implementations disclosed herein may be applied to cellular-based PTT communication systems, other terrestrial-based PTT communication systems, land mobile radio ("LMR") communication systems, hybrid communication systems using one or more of the communication systems described herein or apparent to one of skill in the art, or any other communication systems conceivable by one of skill in the art.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, in some implementations, a talkgroup sharecode as described herein may not expressly be exposed to either a talkgroup sharing organization or a talkgroup owning organization. Instead, in such implementations, some other form of linkage between a talkgroup sharing organization and a talkgroup owning organization may be established that enables the talkgroup owning organization to share a talkgroup with the talkgroup sharing organization. For example, in some implementations, an organization may establish trusted relationships with one or more other organizations, in such implementations, a talkgroup sharing organization may be able to request to share a talkgroup from any of the organizations with which the talkgroup sharing organization previously has established a trusted relationship. Additionally or alternatively, other mechanisms may be provided that enable a talkgroup sharing organization to request and/or a talkgroup owning organization to share a talkgroup. For example, in some implementations, a talkgroup owning organization may be able to share a talkgroup with a talkgroup sharing organization by selecting the desired talkgroup sharing organization from a dropdown menu (e.g., that displays talkgroup sharing organizations with which the talkgroup owning organization previously established trusted relationships). The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method, comprising:
   receiving, from a first communication device associated with a first organization, a request to provide a sharecode;
   providing the sharecode to the first communication device associated with the first organization;
   receiving, from a second communication device associated with a second organization, the sharecode and at least one talkgroup sharing parameter, the at least one talkgroup sharing parameter identifying at least a talkgroup associated with the second organization to be shared with the first organization;
   providing an indication that one or more devices associated with the first organization are permitted to participate in the talkgroup associated with the second organization to the first communication device associated with the first organization;
   receiving a request from the first communication device associated with the first organization to add at least one of the one or more devices associated with the first organization to the talkgroup associated with the second organization; and
   adding the at least one device associated with the first organization to the talkgroup associated with the second organization.

2. The method of claim 1, wherein the sharecode comprises a unique code associated with the first organization.

3. The method of claim 1, wherein:
   receiving at least one talkgroup sharing parameter includes receiving an indication of a time period during which the talkgroup associated with the second organization is to be shared with the first organization; and
   the method further comprises configuring the talkgroup associated with the second organization to terminate access to the talkgroup associated with the second organization by devices associated with the first organization at the end of the time period.

4. The method of claim 3, wherein the time period comprises:
   a start date and a start time that define the beginning of the time period, and
   an end date and an end time that define the end of the time period.

5. The method of claim 1, wherein:
   receiving at least one talkgroup sharing parameter includes receiving an indication of a maximum number of devices associated with the first organization permitted to participate in the talkgroup associated with the second organization; and
   the method further comprises configuring the talkgroup associated with the second organization so that only a number of devices that is equal to or less than the maximum number of devices associated with the first organization is permitted to participate in the talkgroup associated with the second organization.

6. The method of claim 5, further comprising:
   receiving another request from the first communication device associated with the first organization to add another device associated with the first organization to the talkgroup associated with the second organization;
   in response to receiving the other request to add the other device associated with the first organization to the talkgroup associated with the second organization, determining the number of devices associated with the first organization currently participating in the talkgroup associated with the second organization; and
   in response to determining that the number of devices associated with the first organization currently participating in the talkgroup associated with the second organization is less than the maximum number of devices associated with the first organization permitted to participate in the talkgroup associated with the second organization, adding the other device associated with the first organization to the talkgroup associated with the second organization.

7. The method of claim 1, further comprising:
receiving a request, from one of the first communication device associated with the first organization and the second communication device associated with the second organization, to terminate the sharing with the first organization of the talkgroup associated with the second organization; and
in response to receiving the request to terminate the sharing with the first organization of the talkgroup associated with the second organization, removing devices associated with the first organization from the talkgroup associated with the second organization.

8. The method of claim 1, further comprising:
using the sharecode to identify that the first organization is an organization with whom the talkgroup is to be shared.

9. The method of claim 1, wherein:
adding the at least one device associated with the first organization to the talkgroup associated with the second organization includes transmitting a key to the at least one device that enables the at least one device to participate in the talkgroup associated with the second organization.

10. A system, comprising one or more processors configured to:
receive, from a first communication device associated with a first organization, a request to provide a sharecode;
provide the sharecode to the first communication device associated with the first organization;
receive, from a second communication device associated with a second organization, the sharecode and at least one talkgroup sharing parameter, the at least one talkgroup sharing parameter identifying at least a talkgroup associated with the second organization to be shared with the first organization;
provide an indication that one or more devices associated with the first organization are permitted to participate in the talkgroup associated with the second organization to the first communication device associated with the first organization;
receive a request from the first communication device associated with the first organization to add at least one of the one or more devices associated with the first organization to the talkgroup associated with the second organization; and
add the at least one device associated with the first organization to the talkgroup associated with the second organization.

11. The system of claim 10, wherein the one or more processors are further configured to:
receive the at least one talkgroup sharing parameter including an indication of a time period during which the talkgroup associated with the second organization is to be shared with the first organization; and
configure the talkgroup associated with the second organization to terminate access to the talkgroup associated with the second organization by devices associated with the first organization at the end of the time period.

12. The system of claim 10, wherein the one or more processors are further configured to:
receive the at least one talkgroup sharing parameter including an indication of a maximum number of devices associated with the first organization permitted to participate in the talkgroup associated with the second organization; and
configure the talkgroup associated with the second organization so that only a number of devices that is equal to or less than the maximum number of devices associated with the first organization is permitted to participate in the talkgroup associated with the second organization.

13. The system of claim 12, wherein the one or more processors are further configured to:
receive another request from the first communication device associated with the first organization to add another device associated with the first organization to the talkgroup associated with the second organization;
in response to receiving the other request to add the other device associated with the first organization to the talkgroup associated with the second organization, determine the number of devices associated with the first organization currently participating in the talkgroup associated with the second organization; and
in response to determining that the number of devices associated with the first organization currently participating in the talkgroup associated with the second organization is less than the maximum number of devices associated with the first organization permitted to participate in the talkgroup associated with the second organization, add the other device associated with the first organization to the talkgroup associated with the second organization.

14. The system of claim 10, wherein the one or more processors are further configured to:
receive a request, from one of the first communication device associated with first organization and the second communication device associated with the second organization, to terminate the sharing with the first organization of the talkgroup associated with the second organization; and
in response to receiving the request to terminate the sharing with the first organization of the talkgroup associated with the second organization, remove devices associated with the first organization from the talkgroup associated with the second organization.

15. A non-transitory, computer-readable medium configured to store computer-readable instructions that, when executed by a computer, instruct the computer to perform a method comprising:
receiving, from a second communication device associated with a second organization, a sharecode and at least one talkgroup sharing parameter, the at least one talkgroup sharing parameter identifying at least a talkgroup associated with the second organization to be shared with a first organization;
providing an indication that one or more devices associated with the first organization are permitted to participate in the talkgroup associated with the second organization to a first communication device associated with the first organization;
receiving a request from the first communication device associated with the first organization to add at least one of the one or more devices associated with the first organization to the talkgroup associated with the second organization; and
adding the at least one device associated with the first organization to the talkgroup associated with the second organization.

16. The non-transitory, computer-readable medium according to claim 15, wherein:
receiving at least one talkgroup sharing parameter includes receiving an indication of a time period during which the talkgroup associated with the second organization is to be shared with the first organization; and the computer-readable instructions instruct the computer to execute the method further comprising configuring the talkgroup associated with the second organization to terminate access to the talkgroup associated with the second organization by devices associated with the first organization at the end of the time period.

17. The non-transitory, computer-readable medium according to claim 16, wherein the time period comprises:
   a start date and a start time that define the beginning of the time period, and
   an end date and an end time that define the end of the time period.

18. The non-transitory, computer-readable medium according to claim 15, wherein:
   receiving at least one talkgroup sharing parameter includes receiving an indication of a maximum number of devices associated with the first organization permitted to participate in the talkgroup associated with the second organization; and
   the computer-readable instructions instruct the computer to execute the method further comprising configuring the talkgroup associated with the second organization so that only a number of devices that is equal to or less than the maximum number of devices associated with the first organization is permitted to participate in the talkgroup associated with the second organization.

19. The non-transitory, computer-readable medium according to claim 18, wherein the computer-readable instructions instruct the computer to execute the method further comprising:
   receiving another request from the first communication device associated with the first organization to add another device associated with the first organization to the talkgroup associated with the second organization;
   in response to receiving the other request to add the other device associated with the first organization to the talkgroup associated with the second organization, determining the number of devices associated with the first organization currently participating in the talkgroup associated with the second organization; and
   in response to determining that the number of devices associated with the first organization currently participating in the talkgroup associated with the second organization is less than the maximum number of devices associated with the first organization permitted to participate in the talkgroup associated with the second organization, adding the other device associated with the first organization to the talkgroup associated with the second organization.

20. The non-transitory, computer-readable medium according to claim 15, wherein the computer-readable instructions instruct the computer to execute the method further comprising:
   receiving a request, from one of the first communication device associated with first organization and the second communication device associated with the second organization, to terminate the sharing with the first organization of the talkgroup associated with the second organization; and
   in response to receiving the request to terminate the sharing with the first organization of the talkgroup associated with the second organization, removing devices associated with the first organization from the talkgroup associated with the second organization.

* * * * *

UNITED STATES PATENT AND TRADEMARK OFFICE
CERTIFICATE OF CORRECTION

| | |
|---|---|
| PATENT NO. | : 9,525,981 B2 |
| APPLICATION NO. | : 14/617302 |
| DATED | : December 20, 2016 |
| INVENTOR(S) | : Daniel Tillet et al. |

It is certified that error appears in the above-identified patent and that said Letters Patent is hereby corrected as shown below:

On the Title Page

In Item (72) Inventors:
"Daniel Tillet, McLean, VA (US); Garrett Chandler, McLean, VA (US)"
Should read as:
--Daniel Tillet, McLean, VA (US); Garrett Chandler, McLean, VA (US); Steven Haigh, Royston (GB)--.

Signed and Sealed this
Sixteenth Day of May, 2023

Katherine Kelly Vidal
*Director of the United States Patent and Trademark Office*